United States Patent
Kanai

(10) Patent No.: US 8,335,759 B2
(45) Date of Patent: Dec. 18, 2012

(54) WORK ANALYSIS DEVICE AND RECORDING MEDIUM RECORDING WORK ANALYSIS PROGRAM

(75) Inventor: Tsuyoshi Kanai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1077 days.

(21) Appl. No.: 12/042,056

(22) Filed: Mar. 4, 2008

(65) Prior Publication Data

US 2008/0229296 A1 Sep. 18, 2008

(30) Foreign Application Priority Data

Mar. 13, 2007 (JP) ................................ 2007-062811

(51) Int. Cl.
*G06F 7/00* (2006.01)
*G06F 17/00* (2006.01)
*G06F 17/30* (2006.01)

(52) U.S. Cl. ........ 707/608; 707/769; 705/7.27; 717/154

(58) Field of Classification Search .................. None
See application file for complete search history.

(56) References Cited

U.S. PATENT DOCUMENTS

| | | | |
|---|---|---|---|
| 6,038,538 A | | 3/2000 | Agrawal et al. |
| 6,074,426 A | * | 6/2000 | Baumgartner et al. ......... 703/13 |
| 6,738,955 B2 | * | 5/2004 | Andersen et al. ............. 716/136 |
| 7,275,039 B2 | * | 9/2007 | Setteducati .................. 705/7.24 |
| 7,650,595 B2 | * | 1/2010 | Qadeer et al. ................. 717/127 |
| 2006/0230404 A1 | * | 10/2006 | Sato et al. ..................... 718/102 |
| 2008/0155239 A1 | * | 6/2008 | Chowdhury et al. ......... 712/245 |

FOREIGN PATENT DOCUMENTS

| EP | 0 895 169 | 2/1999 |
|---|---|---|
| JP | 2005-115494 | 4/2005 |

OTHER PUBLICATIONS

W.M.P. van der Aalst et al., "Discovering Workflow Performance Models from Timed Logs", Lecture Notes in Computer Science, 2002, 19 pages.*
Ping Zhang et al., "Discovery, visualization and performance analysis of enterprise workflow", Computational Statistics and Data Analysis, Norh-Holland, Amsterdam, NL, vol. 41, No. 5, Nov. 18, 2006, pp. 2670-2687.
W.M.P. van der Aalst et al., "Discovering Workflow Performance Models from Timed Logs", Lecture Notes in Computer Science, 2002, 19pgs.
W.M.P. van der Aalst et al., "Workflow Mining: A Survey of Issues and Approaches", Data & Knowledge Engineering, Amsterdam, NL, vol. 47, No. 2, Jan. 1, 2003, pp. 237-267.
Extended European Search Report, mailed Aug. 1, 2008 and issued in corresponding European Patent Application No. 08152555.2-2211.

* cited by examiner

*Primary Examiner* — Loan T Nguyen
(74) *Attorney, Agent, or Firm* — Staas & Halsey LLP

(57) ABSTRACT

A device analyzes a flow of a computer system by identifying transition relations each representing a relation between two of data sets that have been updated, based upon workflow information. Transition information indicate a number of occurrences of each transition relation, with respect to each analysis unit period. Change information indicates a change in the number of occurrences of each transition relation, by comparing the transition information for each analysis unit period between adjacent ones of the analysis unit periods.

18 Claims, 29 Drawing Sheets

FIG. 5

UPDATE INFORMATION STORING SECTION ~110

GENERAL UPDATE INFORMATION TABLE ~111

| DATE AND TIME | TABLE NAME | PROCESS ID |
|---|---|---|
| 2006/01/24 09:08:48 | RESERVATION | 011 |
| 2006/01/28 16:51:22 | ARRANGEMENTS | 011 |
| 2006/01/29 15:38:51 | ARRANGEMENTS | 012 |
| 2006/02/01 10:11:29 | RESERVATION | 013 |
| ⋮ | ⋮ | ⋮ |

FIG. 6

PERIOD INFORMATION STORING SECTION ~120

PERIOD INFORMATION TABLE ~121

| PERIOD ID | START DATE | FINISH DATE |
|---|---|---|
| #01 | 2006/01/01 | 2006/01/31 |
| #02 | 2006/02/01 | 2006/02/28 |
| #03 | 2006/03/01 | 2006/03/31 |
| ⋮ | ⋮ | ⋮ |

FIG. 9

UPDATE INFORMATION STORING SECTION

UPDATE INFORMATION TABLE — ID#01

| DATE AND TIME | TABLE NAME | PROCESS ID |
|---|---|---|
| 2006/01/24 09:08:48 | RESERVATION | 011 |
| 2006/01/28 16:51:22 | ARRANGEMENTS | 011 |
| 2006/01/29 15:38:51 | ARRANGEMENTS | 012 |
| ⋮ | ⋮ | ⋮ |

UPDATE INFORMATION TABLE — ID#02

| DATE AND TIME | TABLE NAME | PROCESS ID |
|---|---|---|
| ⋮ | ⋮ | ⋮ |

UPDATE INFORMATION TABLE — ID#03

| DATE AND TIME | TABLE NAME | PROCESS ID |
|---|---|---|
| ⋮ | ⋮ | ⋮ |

130 WORK INFORMATION STORING SECTION

131a

| WORKFLOW TABLE | ID#01 |
|---|---|
| ACTIVITY SEQUENCE | NUMBER OF OCCURRENCES |
| RESERVATION → ARRANGEMENTS → ARRANGEMENT DETAILS → INSPECTION | 350 |
| ARRANGEMENTS → ARRANGEMENT DETAILS → INSPECTION → CANCELLATION | 95 |
| ⋮ | ⋮ |

131b

| WORKFLOW TABLE | ID#02 |
|---|---|
| ACTIVITY SEQUENCE | NUMBER OF OCCURRENCES |
| ⋮ | ⋮ |

131c

| WORKFLOW TABLE | ID#03 |
|---|---|
| ACTIVITY SEQUENCE | NUMBER OF OCCURRENCES |
| ⋮ | ⋮ |

WORK INFORMATION STORING SECTION 130

ACTIVITY TRANSITION TABLE 132a — ID#01

| | RESERVATION | ARRANGEMENTS | ARRANGEMENT DETAILS | INSPECTION | CANCELLATION |
|---|---|---|---|---|---|
| RESERVATION | 0 | 431 | 0 | 0 | 0 |
| ARRANGEMENTS | 0 | 0 | 1240 | 0 | 0 |
| ARRANGEMENT DETAILS | 0 | 0 | 5 | 1240 | 0 |
| INSPECTION | 0 | 0 | 0 | 7 | 234 |
| CANCELLATION | 0 | 0 | 0 | 0 | 0 |

ACTIVITY TRANSITION TABLE 132b — ID#02

| | RESERVATION | ARRANGEMENTS | ARRANGEMENT DETAILS | INSPECTION | CANCELLATION |
|---|---|---|---|---|---|
| ... | ... | ... | ... | ... | ... |

ACTIVITY TRANSITION TABLE 132c — ID#03

| | RESERVATION | ARRANGEMENTS | ARRANGEMENT DETAILS | INSPECTION | CANCELLATION |
|---|---|---|---|---|---|
| ... | ... | ... | ... | ... | ... |

FIG. 15

CHANGE INFORMATION STORING SECTION (140)

ACTIVITY CHANGE TABLE (141a) — ID#01 TO 02

| | RESERVATION | ARRANGEMENTS | ARRANGEMENT DETAILS | INSPECTION | CANCELLATION |
|---|---|---|---|---|---|
| RESERVATION | | DISAPPEARED | | | |
| ARRANGEMENTS | | | −2% | | |
| ARRANGEMENT DETAILS | | | NEW | | |
| INSPECTION | | | | −2% | +34% |
| CANCELLATION | | | | | |

ACTIVITY CHANGE TABLE (141b) — ID#02 TO 03

| | RESERVATION | ARRANGEMENTS | ARRANGEMENT DETAILS | INSPECTION | CANCELLATION |
|---|---|---|---|---|---|
| ... | ... | ... | ... | ... | ... |

ACTIVITY CHANGE TABLE (141c) — ID#03 TO 04

| | RESERVATION | ARRANGEMENTS | ARRANGEMENT DETAILS | INSPECTION | CANCELLATION |
|---|---|---|---|---|---|
| ... | ... | ... | ... | ... | ... |

FIG. 16

<<SELECT DISPLAY METHOD OF ANALYSIS RESULTS>>

● TRANSITIONS WITH MARKED CHANGES IN NUMBER OF INSTANCES

○ COMPARISON OF NUMBER OF INSTANCES WITH PREVIOUS PERIOD

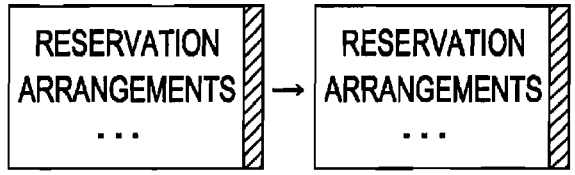

○ TIME-SERIES CHANGE IN NUMBER OF INSTANCES

RESERVATION ARRANGEMENTS ... → RESERVATION ARRANGEMENTS ...

ENTER

FIG. 17

<<TRANSITIONS WITH MARKED CHANGES IN NUMBER OF INSTANCES>>

NEW TRANSITION
    2006/02: ARRANGEMENT DETAILS
        → ARRANGEMENT DETAILS
        ...

DISAPPEARED TRANSITION
    2006/02: RESERVATION → ARRANGEMENTS
        ...

TRANSITIONS WITH INCREASED NUMBER OF INSTANCES (+30% OR MORE)
    2006/02: INSPECTION → CANCELLATION
        ...

TRANSITIONS WITH DECREASED NUMBER OF INSTANCES (−30% OR MORE)
    2006/04: INSPECTION → CANCELLATION
        ...

FIG. 23

WORK INFORMATION STORING SECTION — 130a

ELAPSED TIME INFORMATION TABLE — ID#01 (133a)

| TRANSITION SOURCE | TRANSITION TARGET | ELAPSED TIME |
|---|---|---|
| RESERVATION | ARRANGEMENTS | 4:21 |
| RESERVATION | ARRANGEMENTS | 3:51 |
| ARRANGEMENTS | ARRANGEMENT DETAILS | 10:38 |
| ⋮ | ⋮ | ⋮ |

ELAPSED TIME INFORMATION TABLE — ID#02 (133b)

| TRANSITION SOURCE | TRANSITION TARGET | ELAPSED TIME |
|---|---|---|
| ⋮ | ⋮ | ⋮ |

ELAPSED TIME INFORMATION TABLE — ID#03 (133c)

| TRANSITION SOURCE | TRANSITION TARGET | ELAPSED TIME |
|---|---|---|
| ⋮ | ⋮ | ⋮ |

WORK INFORMATION STORING SECTION 130a

ID#01 — 134a

| ACTIVITY TRANSITION TIME TABLE (MEAN) | RESERVATION | ARRANGEMENTS | ARRANGEMENT DETAILS | INSPECTION | CANCELLATION |
|---|---|---|---|---|---|
| RESERVATION | | 4:32 | 0 | 0 | 0 |
| ARRANGEMENTS | 0 | | 12:09 | 0 | 0 |
| ARRANGEMENT DETAILS | 0 | 0 | | 22:15 | 0 |
| INSPECTION | 0 | 0 | 5 | | 3:19 |
| CANCELLATION | 0 | 0 | 0 | 0:42 | |

ID#02 — 134b

| ACTIVITY TRANSITION TIME TABLE (MEAN) | RESERVATION | ARRANGEMENTS | ARRANGEMENT DETAILS | INSPECTION | CANCELLATION |
|---|---|---|---|---|---|
| ... | ... | ... | ... | ... | ... |

ID#03 — 134c

| ACTIVITY TRANSITION TIME TABLE (MEAN) | RESERVATION | ARRANGEMENTS | ARRANGEMENT DETAILS | INSPECTION | CANCELLATION |
|---|---|---|---|---|---|
| ... | ... | ... | ... | ... | ... |

FIG. 27

CHANGE INFORMATION STORING SECTION — 140a

ACTIVITY TIME CHANGE TABLE (MEAN) — 142a

| | ID#01 TO 02 | | | |
|---|---|---|---|---|
| | RESERVATION | ARRANGEMENTS | ARRANGEMENT DETAILS | INSPECTION | CANCELLATION |
| RESERVATION | | | | | |
| ARRANGEMENTS | | | +5% | | |
| ARRANGEMENT DETAILS | | | | +45% | |
| INSPECTION | | | | | −3% |
| CANCELLATION | | | | | |

ACTIVITY TIME CHANGE TABLE (MEAN) — 142b

| | ID#02 TO 03 | | | |
|---|---|---|---|---|
| | RESERVATION | ARRANGEMENTS | ARRANGEMENT DETAILS | INSPECTION | CANCELLATION |
| ... | ... | ... | ... | ... | ... |

ACTIVITY TIME CHANGE TABLE (MEAN) — 142c

| | ID#03 TO 04 | | | |
|---|---|---|---|---|
| | RESERVATION | ARRANGEMENTS | ARRANGEMENT DETAILS | INSPECTION | CANCELLATION |
| ... | ... | ... | ... | ... | ... |

<<TRANSITIONS WITH MARKED CHANGES IN TRANSITION TIME>>

TRANSITIONS WITH INCREASED TRANSITION TIME (+30% OR MORE)
   2006/02:   ARRANGEMENT DETAILS → INSPECTION
            ...

TRANSITIONS WITH DECREASED TRANSITION TIME (−30% OR MORE)
   2006/04:   INSPECTION → CANCELLATION
            ...

WORK ANALYSIS DEVICE AND RECORDING MEDIUM RECORDING WORK ANALYSIS PROGRAM

CROSS-REFERENCE TO RELATED APPLICATIONS

This application is related to and claims priority to Japanese patent application no. 2007-62811 filed on Mar. 13, 2007 in the Japan Patent Office, and incorporated by reference herein.

BACKGROUND

Field

The inventive embodiments relate to a recording medium recording a work analysis program and a work analysis device, including methods thereof, and more specifically to a recording medium recording a work analysis program and a work analysis device which analyze a flow of work on the basis of the operating status of a computer system.

SUMMARY

According to an aspect of an embodiment, a work analysis device analyzes a flow of work on the basis of an operating status of a computer system. The work analysis device stores update information including identifiers for individually identifying work processes accompanying updates of a plurality of data sets, update times at which the data sets were updated, and set names of the updated data sets are associated with each other. A work analysis device stores period information that defines a splitting of at least a part of an operating period of the computer system into a plurality of analysis unit periods. An update information classifier classifies the update information into the analysis unit periods corresponding to the update times, by referring to the period information, a workflow extractor extracts workflow information, in which the set names of the data sets are sorted by the earliest update time for each of the work processes, with respect to each of the analysis unit periods on the basis of the update information classified by the update information classifier into the analysis unit period, a transition information generator identifies transition relations each representing a relation between two of the data sets that have been successively updated, on the basis of the generated workflow information, and generating transition information indicating the number of occurrences of each of the transition relations, with respect to each of the analysis unit periods, and a change information generator generates and outputs change information indicating a change in the number of occurrences of each of the transition relations, by comparing the transition information generated for each of the analysis unit periods by the transition information generator between adjacent ones of the analysis unit periods.

These together with other aspects and advantages which will be subsequently apparent, reside in the details of construction and operation as more fully hereinafter described and claimed, reference being had to the accompanying drawings forming a part hereof wherein like numerals refer to like parts throughout.

BRIEF DESCRIPTION OF THE DRAWINGS

FIG. 5 is a diagram showing an example of the data structure of a general update information table;

FIG. 6 is a diagram showing an example of the data structure of a period information table;

FIG. 9 is a diagram showing examples of the data structure of an update information table;

FIG. 11 is a diagram showing examples of the data structure of a workflow table;

FIG. 13 is a diagram showing examples of the data structure of an activity transition table;

FIG. 15 is a diagram showing examples of the data structure of an activity change table;

FIG. 16 is a diagram showing an example of a selection screen for selecting a display method;

FIG. 17 is a diagram showing an example of a display screen for displaying analysis results according to a first display method;

FIG. 23 is a diagram showing examples of the data structure of an elapsed time information table;

FIG. 25 is a diagram showing examples of the data structure of an activity transition time table;

FIG. 27 is a diagram showing examples of the data structure of an activity time change table;

FIG. 29 is a diagram showing an example of a display screen for displaying analysis results according to a fourth display method;

DESCRIPTION OF THE PREFERRED EMBODIMENTS

Figure 1:
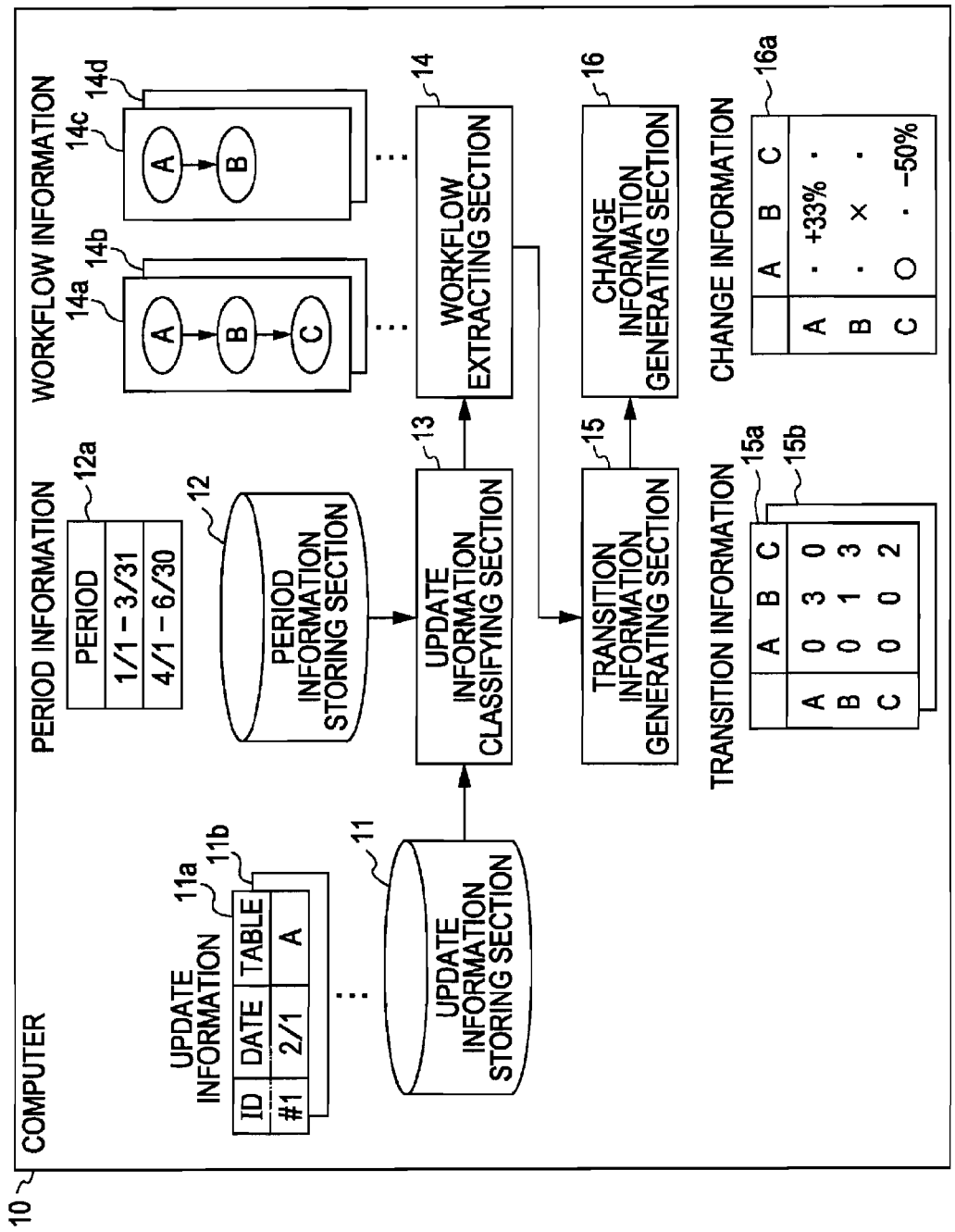
FIG. 1 is a diagram of an overview of work analysis according to an embodiment.

At the present time, data processing using a computer has become widespread, and computer systems are used in a wide variety of work. For example, in companies that engage in sales of products to customers, computer systems are used to perform processes such as customer information management, product stock control, and received-order management. Since a flow of work (hereinafter, referred to as a workflow) using a computer system is highly complex, a workflow diagram is created for easier grasping of a workflow. A workflow diagram is described in a graphic form allowing the user to understand a workflow. Use of a workflow allows the manager or system administrator to understand a workflow intuitively. A workflow diagram is often created as one of design drawings at the time of introduction of a computer system.

A workflow diagram is not something that needs to be created only once but must be created again as appropriate. This is because a workflow often changes with the passage of time from the time of initial introduction of a computer system. The latest workflow diagram is required for the system administrator to judge whether or not the current method of use of the computer system is appropriate. Also, the latest workflow diagram is required for the manager to consider a review of work contents, restructuring of the computer system, and the like.

Meanwhile, the problem with a workflow diagram is that it requires considerable effort to create. In the related art, a workflow diagram is created by the system administrator or the like by conducting a questionnaire or hearing (interview) survey with persons in charge of work. For this reason, it is difficult to create a workflow diagram for grasping the entire work in a short time.

Accordingly, in recent years, attention has been directed to a technique for automatically generating a workflow diagram by analyzing the actual operating status of a computer system. For example, by automatically generating a workflow diagram on the basis of data update status, the effort required for creating a workflow diagram can be significantly reduced, thereby making it possible to obtain the latest workflow diagram in a short time. Since a workflow diagram is generated on the basis of the operating status of the computer system, it is possible to obtain a workflow diagram that more accurately reflects reality as compared with a case where a workflow diagram is created from the results of a hearing or questionnaire survey.

However, the problem with this kind of technique is that although it is possible to identify a workflow at the time of analysis, it is not possible to identify changes in workflow occurring with the passage of time. Meanwhile, there is a demand for considering a review of work contents, relocation of resources, or the like on the basis of changes in workflow. For example, there is a demand for the ability to estimate a preferable workflow from the casual relation between changes in workflow and work performance. Further, there is a demand for the ability to adjust the throughput of the computer system in accordance with changes in workflow.

Hereinbelow, an embodiment will be described with reference to the drawings. First, a description will be given of an overview of this embodiment, followed by description of specific details of this embodiment.

FIG. 1 is a diagram showing an overview of this embodiment. A computer 10 shown in FIG. 1 is used for collecting update information outputted by a computer system, and analyzing a workflow by using the collected update information. The computer 10 has update information storing section 11, period information storing section 12, update information classifying section 13, workflow extracting section 14, transition information generating section 15, and change information generating section 16. These process functions can be realized by, for example, causing the computer 10 to execute a predetermined work analysis program.

The update information storing section 11 stores collected update information 11a, 11b, and so on. The update information 11a, 11b, and so on each include an identifier for identifying each individual work process executed in the past, the update time when a data set was updated, and the set name of an updated data set. A work process includes updating of a plurality of data sets. A data set is, for example, a relational database table or XML (eXtensive Markup Language) data.

The period information storing section 12 stores period information 12a defining a plurality of analysis unit periods. An analysis unit period is part of the period in which the computer system was operating. Preferably, the user defines analysis unit periods in such a way that there will be no overlap between a plurality of analysis unit periods. In the period information 12a, each individual analysis unit period can be defined by specifying the start date/time and the finish date/time. Further, a plurality of analysis unit periods can be defined at once by specifying the length of each analysis unit period, such as in one-month or one-week units. In the example shown in FIG. 1, the period information 12a defines a first analysis unit period (from January 1 to March 31) and a second analysis unit period (from April 1 to June 30).

The update information classifying section 13 sorts the update information 11a, 11b, and so on stored in the update information classifying section 13, on the basis of the time information 12a stored in the period information storing section 12. That is, the update information classifying section 13 checks the update time of each individual piece of update information, and classifies the piece of update information into an analysis unit period within which the update time is included. In the example shown in FIG. 1, the update time of the update information 11a is February 1, so the update information 11a is classified into the first analysis unit period.

The workflow extracting section 14 generates workflow information for each work process with respect to each individual analysis unit period, on the basis of update information assigned to this analysis unit period by the update information classifying section 13. In the workflow information, the set names of updated data sets are arranged in the order of earliest update time. That is, the workflow extracting section 14 classifies update information in accordance with a work process identifier, and arrange pieces of update information belonging to respective classifications in the order of earliest update time, thereby generating workflow information. Accordingly, a plurality of pieces of workflow information are generated for every analysis unit period. In the example shown in FIG. 1, pieces of workflow information 14a, 14b each correspond to the first analysis unit period, and pieces of workflow information 14c, 14d each correspond to the second analysis unit period.

The transition information generating section 15 identifies a transition relation as a relation between two successively updated data sets with respect to each individual analysis unit period, on the basis of the workflow information generated by the workflow extracting section 14. For instance, suppose that there is workflow information having a sequence of data set names "Data Set A", "Data Set B", and "Data Set C". In this case, a transition relation where the transition source is "Data Set A" and the transition target is "Data Set B", and a transition relation where the transition source is "Data Set B" and the transition target is "Data Set C" are identified.

Then, the transition information generating section 15 generates transition information indicating the number of occurrences of each individual transition relation. The transition information is represented in, for example, a two-dimensional tabular format. It should be noted that transition relations include one in which a data set as the transition source and a data set as the transition target are the same, that is, a relation where the same data sets are updated successively. In the example shown in FIG. 1, transition information 15a corresponds to the first analysis unit period, and transition information 15b corresponds to the second analysis unit period.

The change information generating section 16 compares the transition information for each analysis unit period, which is generated by the transition information generating section 15, between two and/or among two or more analysis unit periods, for example, between two adjacent (succeeding) analysis unit periods. For instance, in a case where N analysis unit periods are defined in the period information 12a, that is, N pieces of transition information are generated by the transition information generating section 15, the change information generating section 16 makes a comparison N-1 times in case of adjacent analysis unit periods. Then, the change information generating section 16 generates and outputs change information 16a indicating changes in the number of occurrences of each individual transition relation. The change information 16a includes, for example, information indicating new transition relations that have occurred or transition relations that have disappeared with the elapse of time. Also, the change information 16a includes information indicating a rate of change in the number of occurrences relative to the immediately previous analysis unit period.

In the example shown in FIG. 1, "O" described in the field of a transition relation from "Data Set C" to "Data Set A" indicates that the transition relation concerned has newly occurred in the second analysis unit period. Further, "X" described in the field of a transition relation from "Data Set B" to "Data Set B" indicates that the transition relation concerned has disappeared in the second analysis unit period. The numerical values described in the field of a transition relation from "Data Set A" to "Data Set B" and in the field of a transition relation from "Data Set C" to "Data Set C" each indicate a rate of change in the number of occurrences. "●" described in the fields of other transition relations indicate that there is no change in the number of occurrences.

As shown in FIG. 1 for example, the change information 16a can be represented in a two-dimensional tabular format. In a case where three or more analysis unit periods are defined in the period information 12a, the change information generating section 16 may generate a table indicating a difference in the number of occurrences for every pair of analysis unit periods, or time-series variation in the number of occurrences may be represented by a single table.

According to the computer 10 as described above, the pieces of update information 11a, 11b, and so on are classified by the update information classifying section 13 into analysis unit periods corresponding to their update times. Next, with respect to each individual analysis unit period, the workflow extracting section 14 generates workflow information in which the set names of data sets are arranged in the order of earliest update time for every work process. Then, with respect to each individual analysis unit period, the transition information generating section 15 identifies a transition relation as a relation between two successively updated data sets, and generates transition information indicating the number of occurrences of each individual transition relation. Thereafter, the change information generating section 16 compares transition information for every analysis unit period between adjacent analysis unit periods, generating the change information 16a indicating changes in the number of occurrences of each individual transition relation.

The user can thus learn what kind of change in workflow occurred and when, during the operating period of the computer system. Therefore, it is possible for the manager or system administrator to consider an appropriate review of work contents, relocation of resources, and the like in accordance with the trend in the change of workflow. Preferably, the generated change information 16a is then visually displayed in a graphic form for easier understanding.

Hereinbelow, this embodiment will be described in detail with reference to the drawings.

First Embodiment

Figure 2:
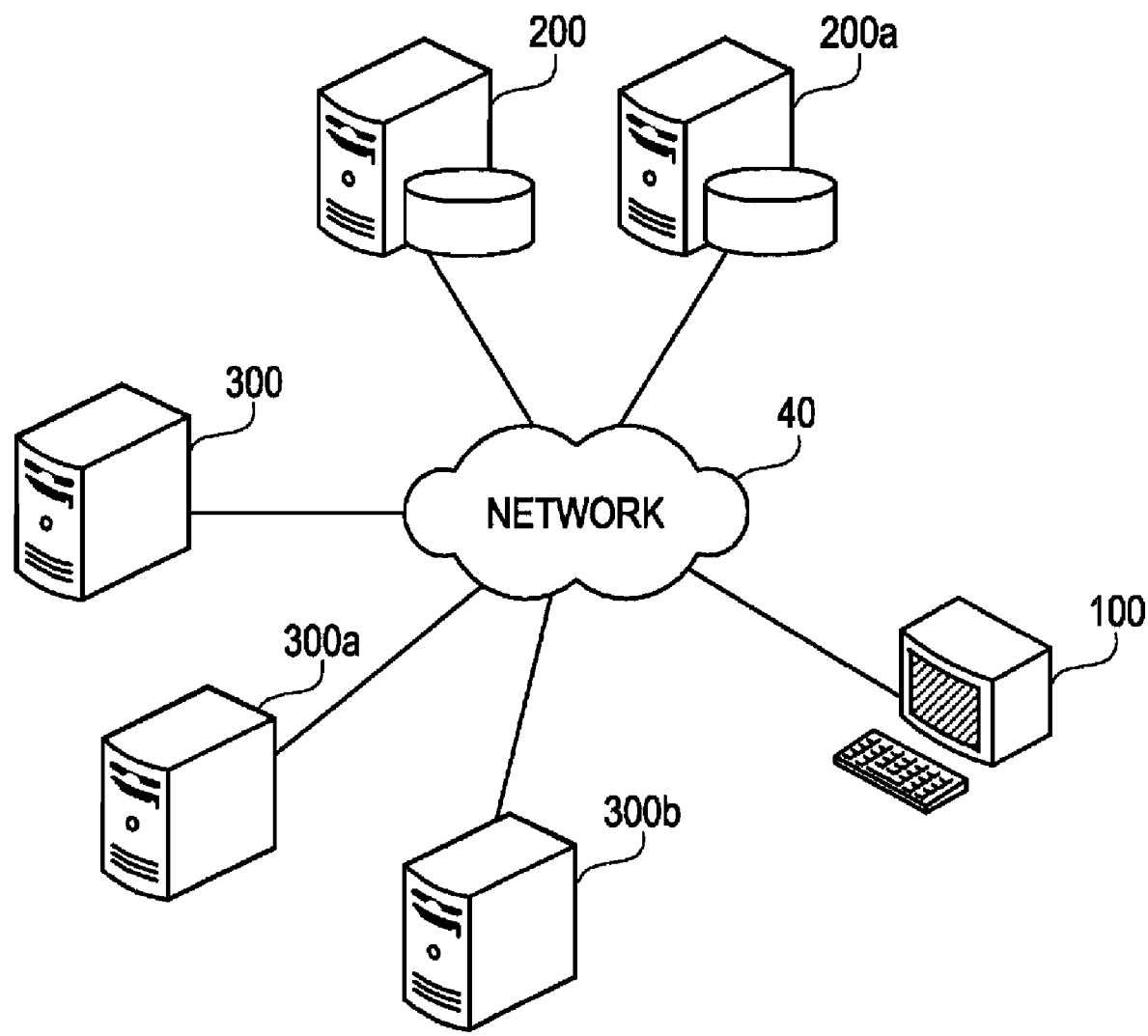
FIG. 2 is a diagram showing a system configuration according to the embodiment.

FIG. 2 is a diagram showing a system configuration according to this embodiment. A work analysis system shown in FIG. 2 performs an analysis of a workflow on the basis of database update information outputted by a database management system.

The work analysis system according to this embodiment includes a work analysis device 100, database servers 200, 200a, work servers 300, 300a, 300b, and a network 40. The work analysis device 100, the database servers 200, 200a, and the work servers 300, 300a, 300b are connected to the network 40 and capable of mutual communication.

The work analysis device 100 is a computer that performs an analysis of a workflow in response to a user's operation input, and displays the analysis results. The work analysis device 100 acquires an update log file held on each of the database servers 200, 200a. An update log file is a file describing one or more pieces of update information. The work analysis device 100 analyzes update information described in the acquired update log file, and estimates a workflow for every analysis unit period defined in advance. The work analysis device 100 also compares a plurality of estimated workflows with each other to detect changes in workflow due to elapse of time.

The database servers 200, 200a are each a computer that executes a program for realizing the database management system. The database management system manages work data used by a work program executed by each of the work servers 300, 300a, 300b. The database management system manages work data in a table format, and performs work data retrieval and update processes in response to a request from the work program. At this time, upon executing the update process of work data, the database management system adds update information to an update log file. The update log file is held on each of the individual servers 200, 200a.

The work servers 300, 300a, 300b are each a computer that executes a work program specified by a user's operation input. The work programs executed by the work servers 300, 300a, 300b use the work data held on the database servers 200, 200a via the network 40 as appropriate.

While in this embodiment the work analysis device 100 is provided as a device that performs a workflow analysis, it is possible to realize the function of the work analysis device 100 by the database servers 200, 200a. Further, it is also possible to realize the function of the work analysis device 100 by the work servers 300, 300a, 300b.

Next, a description will be given of the hardware configurations of the database servers 200, 200a and work servers 300, 300a, 300b.

Figure 3:
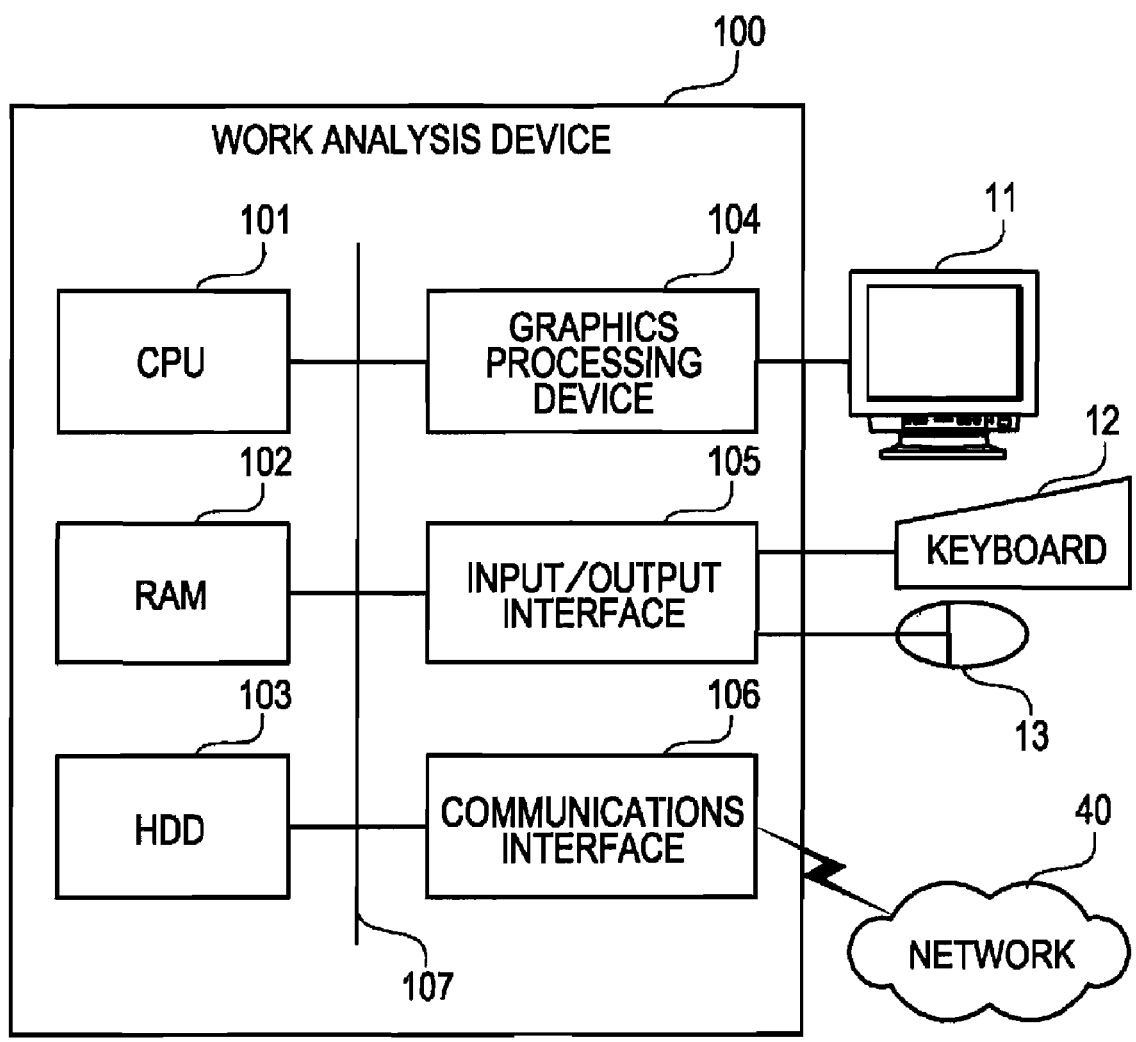
FIG. 3 is a diagram showing the hardware configuration of a work analysis device.

FIG. 3 is a diagram showing the hardware configuration of the work analysis device. The work analysis device 100 as a whole is controlled by a CPU (Central Processing Unit) 101. Connected to the CPU 101 via a bus 107 are a RAM (Random Access Memory) 102, an HDD (Hard Disk Drive) 103, a graphics processing device 104, an input/output interface 105, and a communications interface 106.

At least part of an OS (Operating System) program or application program to be executed by the CPU 101 is temporarily stored in the RAM 102. Also, at least part of various data necessary for the processing by the CPU 101 is temporarily stored in the RAM 102. An OS program or application program is stored in the HDD 103. Also, various data necessary for the processing by the CPU 101 is stored in the HDD 103.

A monitor 11 is connected to the graphics processing device 104. The graphics processing device 104 causes an image to be displayed on the screen of the monitor 11 in accordance with a command from the CPU 101. A keyboard 12 and a mouse 13 are connected to the input/output interface 105. The input/output interface 105 transmits a signal sent from the keyboard 12 or the mouse 13 to the CPU 101 via the bus 107. The communications interface 106 is connected to the network 40.

The database servers 200, 200a and the work servers 300, 300a, 300b can be also realized by the same hardware configuration as that of the work analysis device 100. The process function according to this embodiment can be realized by the hardware configuration as described above.

Next, the module configuration of the work analysis device 100 will be described.

Figure 4:
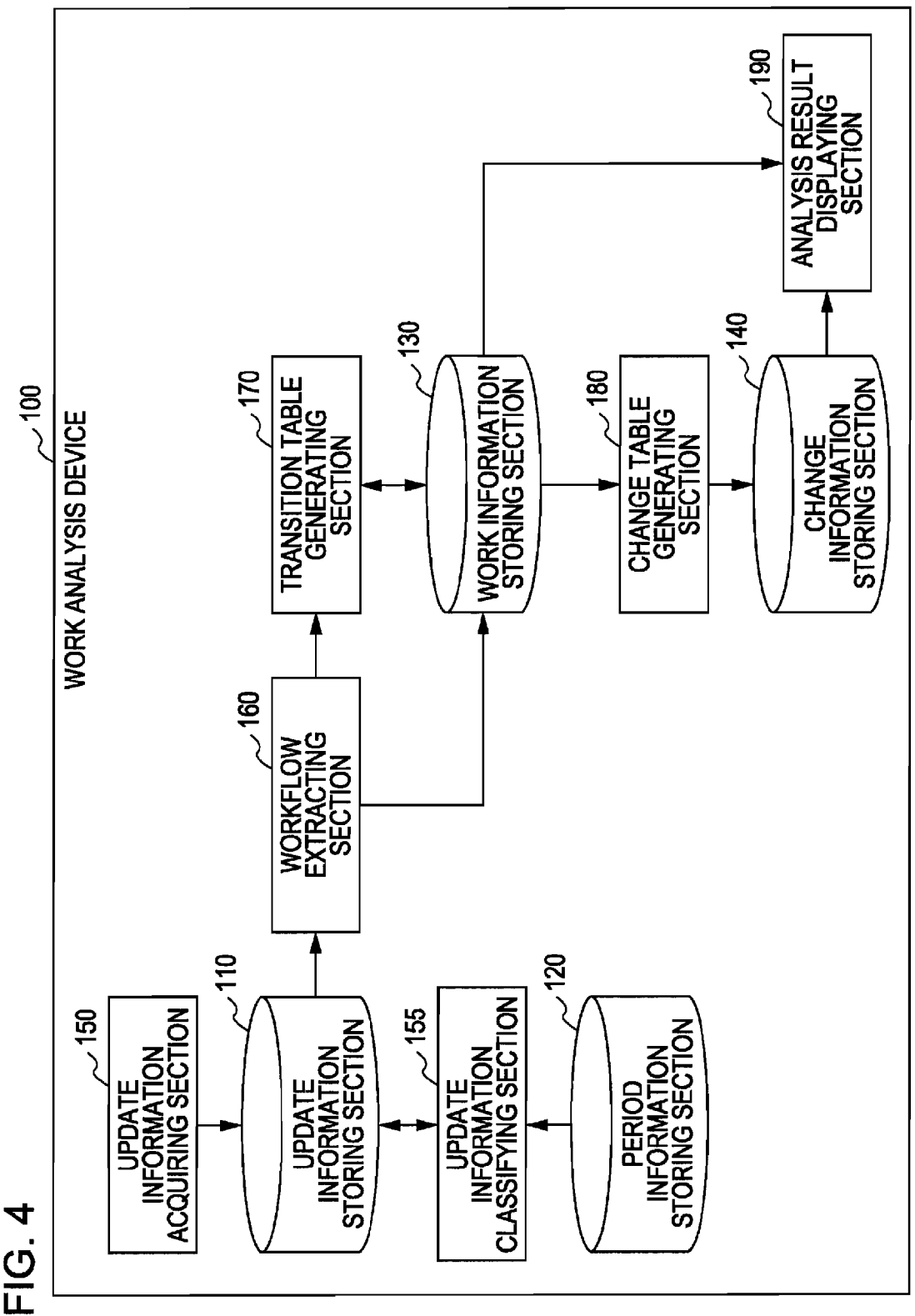
FIG. 4 is a block diagram showing the functions of a work analysis device according to a first embodiment.

FIG. 4 is a block diagram showing the functions of the work analysis device according to a first embodiment. The work analysis device 100 has an update information storing section 110, a period information storing section 120, a work information storing section 130, a change information storing section 140, an update information acquiring section 150, an update information classifying section 155, a workflow extracting section 160, a transition table generating section 170, a change table generating section 180, and an analysis result displaying section 190.

The update information storing section 110 stores update information outputted by the database management system. Update information is created every time a database table is updated. Update information includes the process ID of an executed work process, the update time, and the table name (data activity) of an updated table. Specifically, a table update process is one of the processes of adding, updating, and/or deleting a record with respect to a table. A single work process includes a plurality of table update processes. It should be noted that the update information stored in the update information storing section 110 is classified by each analysis unit period by the update information classifying section 155.

The period information storing section 120 stores period information defining a plurality of analysis unit periods. An analysis unit period is part of the period in which the database servers 200, 200a operated. Each individual analysis unit period can be defined by specifying the start date/time and the finish date/time. Period information can be, for example, created by the administrator of the work analysis device 100 in advance, and stored into the period information storing section 120.

The work information storing section 130 stores workflow information. Workflow information is information indicating a workflow based upon named activity on data, and more specifically, for example, information indicating the updating order of tables and the numbers of their occurrences in a work process. This is because the updating order of tables is considered to most accurately represent a work process in the case of work using a computer system. However, the embodiments are not limited to such a configuration, and any workflow information representing a work process can be provided. Workflow information is information generated halfway through an analysis process. In the work information storing section 130, workflow information is classified by each analysis unit period and stored.

The workflow information storing section 130 also stores an activity transition table for each analysis unit period. An activity transition table shows a list of the numbers of instances of transition relations. A transition relation refers to the relation between two successively updated tables. For example, the activity transition table describes such information that the number of instances in which updating of a table "arrangements" was performed following updating of a table "reservation" is 431. The activity transition table is information generated halfway through an analysis process.

The change information storing section 140 stores an activity change table. An activity change table is a table indicating changes in the numbers of instances of transition relations. The activity change table includes information indicating new occurrences or disappearances of transition relations, and information indicating a rate of change in the number of instances. According to an aspect of an embodiment, activity change table is created for every pair of adjacent analysis unit periods. That is, in a case where N analysis unit areas are defined by the period information, N-1 activity change tables are created. Although the embodiments are not limited to activity changes for adjacent analysis unit periods, and activity changes for other combinations of analysis unit period can be provided. The activity change table is information generated as a result of an analysis process. Time-series variation in workflow can be identified by a series of activity change tables.

The update information acquiring section 150 connects to each of the database servers 200, 200a at preset time intervals and acquires an update log file. Then, the update information acquiring section 150 judges whether or not the acquired update log file contains update information that was newly added after the last acquisition. The presence/absence of new update information can be determined by comparing the last acquisition time of the update log file and the update time of update information. If there is new update information, the update information acquisition section 150 extracts update information from the update log file and stores the update information into the update information storing section 110.

The update information classifying section 155 classifies the update information stored in the update information storing section 110 by each analysis unit period when the start of an analysis process is instructed through an operation input from the user of the work analysis device 100. That is, the update information classifying section 155 acquires period information from the period information storing section 120, and performs classification through comparison between analysis unit periods indicated by the period information and the update times of update information. Update information is thus stored into the update information storing section 110 while being classified by each analysis period.

Upon completion of the processing by the update information classifying section 155, the workflow extracting section 160 generates workflow information on the basis of the update information stored in the update information storing section 110. Specifically, for example, the workflow extracting section 160 classifies update information by each work process, and generates information of sequences of tables, in which updated tables are arranged in the order of earliest update time, with respect to individual work processes. Further, the workflow extracting section 160 adds up information of table sequences to calculate the number of occurrences of the same table sequence. Then, the workflow extracting section 160 stores the generated workflow information into the work information storing section 130. It should be noted that the above-mentioned process is carried out independently for every analysis unit time period.

Upon completion of the processing by the workflow extracting section 160, the transition table generating section 170 generates an activity transition table on the basis of the workflow information stored in the work information storing section 130. Specifically, the transition table generating section 170 decomposes a table sequence indicated by the workflow information into one or more transition relations, and adds up the results by each transition relation to calculate the number of instances. Then, the transition table generating section 170 stores the generated activity transition table into the work information storing section 130. It should be noted that the above-mentioned process is carried out independently for every analysis unit time period.

Upon completion of the processing by the transition table generating section 170, the change table generating section 180 generates an activity change table on the basis of the activity transition table stored in the work information storing section 130. Specifically, the change table generating section 180 compares the activity transition table between adjacent analysis unit periods, and identifies changes in the numbers of occurrences of individual transition relations to generate an activity change table. Then, the change table generating section 180 stores the generated activity change table into the change information storing section 140.

Upon completion of the processing by the change table generating section 180, the analysis result displaying section 190 displays analysis results on the monitor 11 on the basis of the workflow information stored in the work information storing section 130 and the activity change table stored in the change information storing section 140. At this time, the analysis result displaying section 190 urges the user of the work analysis device 100 to select the display method of analysis results, and performs display in accordance with the selected display method. Presumable examples of the display method include a method of displaying analysis results by adding information indicating changes in the number of instances to a workflow diagram, and a method of extracting transition relations with marked changes in the number of instances and displaying a list of these transition relations.

Next, a description will be given of the data structures of update information and period information used in a change analysis process.

FIG. 5 is a diagram showing an example of the data structure of a general update information table. A general update information table 111 shown in FIG. 5 is stored in the update information storing section 110. The general update information table 111 includes an item showing date and time, an item showing table name, and an item showing process ID. Pieces of information arranged in the transverse direction of individual items are associated with each other, constituting update information.

In the item indicating date and time, the date and time when an update process was performed, that is, year/month/day and hour/minute/second are set. In the item indicating table name, the table name of an updated table is set. In the item indicating process ID, an identification number for uniquely identifying a work process is set. This identification number is automatically assigned to each work process by the work program.

New update information is added to the general update information table 111 by the update information acquiring section 150 as appropriate. For example, information indicating "Jan. 24, 2006" as a date and time, "reservation" as a table name, and "011" as a process ID is added. This refers to that either addition, updating, or deletion of a record was executed with respect to a table "reservation" by a work process with a process ID "011" at 09:08:48 on Jan. 24, 2006.

FIG. 6 is a diagram showing an example of data structure of a period information table. A period information table 121 shown in FIG. 6 is stored in the period information storing section 120. The period information table 121 includes an item indicating period ID, an item indicating start date, and an item indicating finish date. Pieces of information arranged in the transverse direction of individual items are associated with each other, defining an analysis unit period.

In the item indicating period ID, an identification code for uniquely identifying an analysis unit period is set. In the item indicating start date, a date as the start point of that analysis unit period is set. In the item indicating finish date, a date as the finish point of that analysis unit period is set. Both the start date and the finish date are included within that analysis unit period. Information stored in the period information table 121 is registered in advance through an operation input by the administrator of the work analysis device 100. For example, information with "#01" as the period ID, "Jan. 1, 2006" as the start date, and "Jan. 31, 2006" as the finish date is registered.

Next, a description will be given of the details of a change analysis process executed on the basis of update information and period information in the work analysis device 100 having the configuration and data structure as described above. The change analysis process is executed when an instruction for starting an analysis is inputted through an operation input by the user of the work analysis device 100.

Figure 7:
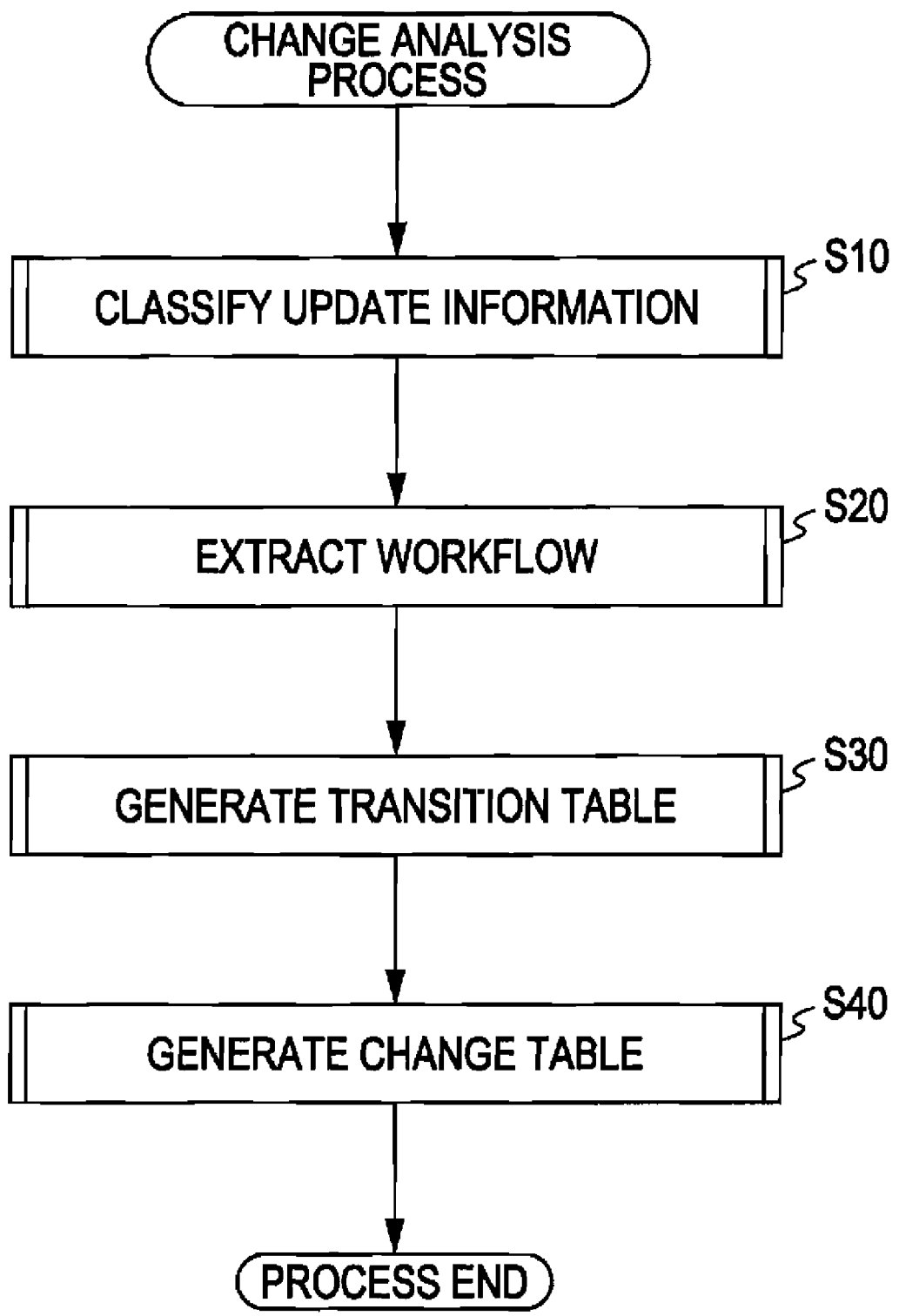
FIG. 7 is a flowchart change analysis according to the first embodiment.

FIG. 7 is a flowchart showing the procedure of a change analysis process according to the first embodiment. Hereinbelow, the process shown in FIG. 7 will be described.

[S10] The update information classifying section 155 acquires update information from the update information storing section 110, and also acquires period information from the period information storing section 120. Then, the update information classifying section 155 classifies the update information by each analysis unit period, and stores the classification results into the update information storing section 110.

[S20] The workflow extracting section 160 acquires the update information from the update information storing section 110 and generates workflow information for every analysis unit period. Then, the workflow extracting section 160 stores the generated workflow information into the work information storing section 130.

[S30] The transition table generating section 170 acquires the workflow information from the work information storing section 130, and generates an activity transition table for each analysis unit period. Then, the transition table generating section 170 stores the generated activity transition table into the work information storing section 130.

[S40] The change table generating section 180 acquires the activity transition table from the work information storing section 130, and generates an activity change table for every pair of analysis unit periods. Then, the change table generating section 180 stores the generated activity change table into the change information storing section 140.

Hereinbelow, a description will be given of the details of an update information classifying process executed in S10, a workflow extracting process executed in S20, a transition table generating process executed in S30, and a change table generating process executed in S40.

Figure 8:
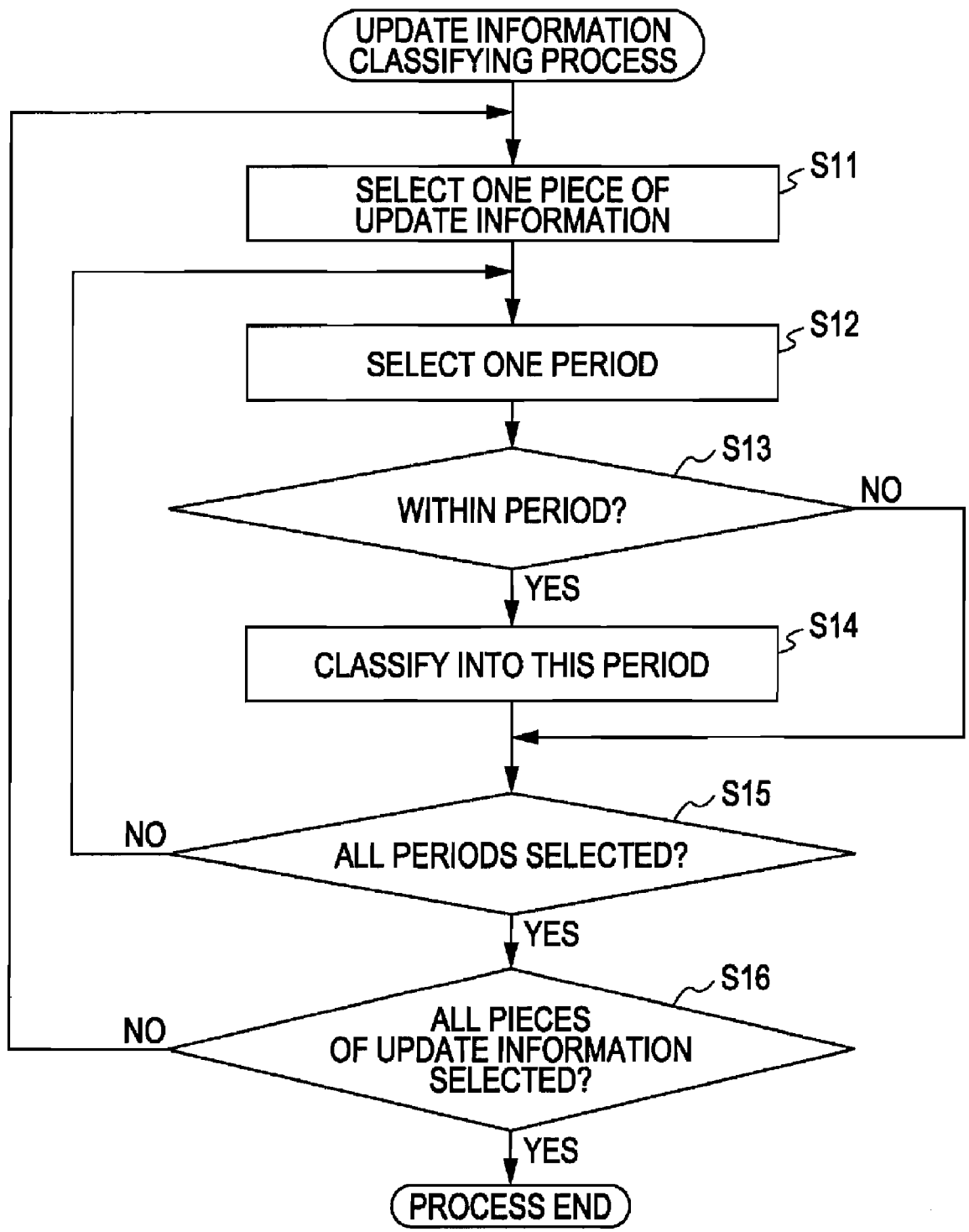
FIG. 8 is a flowchart of update information classifying.

FIG. 8 is a flowchart showing the procedure of the update information classifying process. Hereinbelow, the process shown in FIG. 8 will be described.

[S11] The update information classifying section 155 selects one unselected update information from among the pieces of update information in the general update information table 111 stored in the update information storing section 110.

[S12] The update information classifying section 155 refers to the period information table 121 stored in the period information storing section 120, and selects one unelected analysis unit period.

[S13] The update information classifying section 155 judges whether or not the update time of the update information s elected in S11 falls within the analysis unit period selected in S12. If it is judged that the update time falls within the analysis unit period, the process is advanced to S14. If it is judged that the update time does not fall within the analysis unit period, the process is advanced to S15.

[S14] The update information classifying section 155 classifies the update information selected in S11 into the analysis unit period selected in S12. Specifically, the update information classifying section 155 first checks whether or not an update information table corresponding to the analysis unit period selected in S12 has been created. If the update information table has not been created, the update information table is created within the update information storing section 110. Then, the update information classifying section 155 adds the update information selected in S11 to the update information table corresponding to the analysis unit period selected in S12.

[S15] The update information classifying section 155 judges whether or not all the analysis unit periods have been selected. If it is judged that all the analysis unit periods have been selected, the process is advanced to S16. If it is judged that an unselected analysis unit period exists, the process is advanced to S12.

[S16] The update information classifying section 155 judges whether or not all the pieces of update information have been selected. If it is judged that all the pieces of update information have been selected, the process ends. If it is judged that an unselected piece of update information exists, the process is advanced to S11.

In this way, the update information classifying section 155 determines the analysis unit period into which each individual piece of update information is classified, on the basis of the update time. Then, the update information classifying section 155 stores the classified update information into the update information table for each analysis unit period, which is created within the update information storing section 110. It should be noted that if there is no overlapping period between a plurality of analysis unit periods, one piece of update information is classified into one analysis unit period. On the other hand, if there is an overlapping period between a plurality of analysis unit periods, there may be cases where one piece of update information is classified into a plurality of analysis unit periods.

FIG. 9 is a diagram showing examples of the data structure of an update information table. Update information tables 112a, 112b, 112c, and so on shown in FIG. 9 are stored in the update information storing section 110. The update information table 112a is an update information table corresponding to an analysis unit period whose period ID is "#01". The update information table 112b is an update information table corresponding to an analysis unit period whose period ID is "#02". The update information table 112c is an update information table corresponding to an analysis unit period whose period ID is "#03".

The update information tables 112a, 112b, 112c, and so on each include an item showing date and time, an item showing table name, and an item showing process ID. Pieces of information arranged in the transverse direction of individual items are associated with each other, constituting update information. The respective items correspond to the items of the same names in the general update information table 111 shown in FIG. 5. Update information is added to each of the update information tables 112a, 112b, 112c, and so on by the update information classifying section 155.

Figure 10:
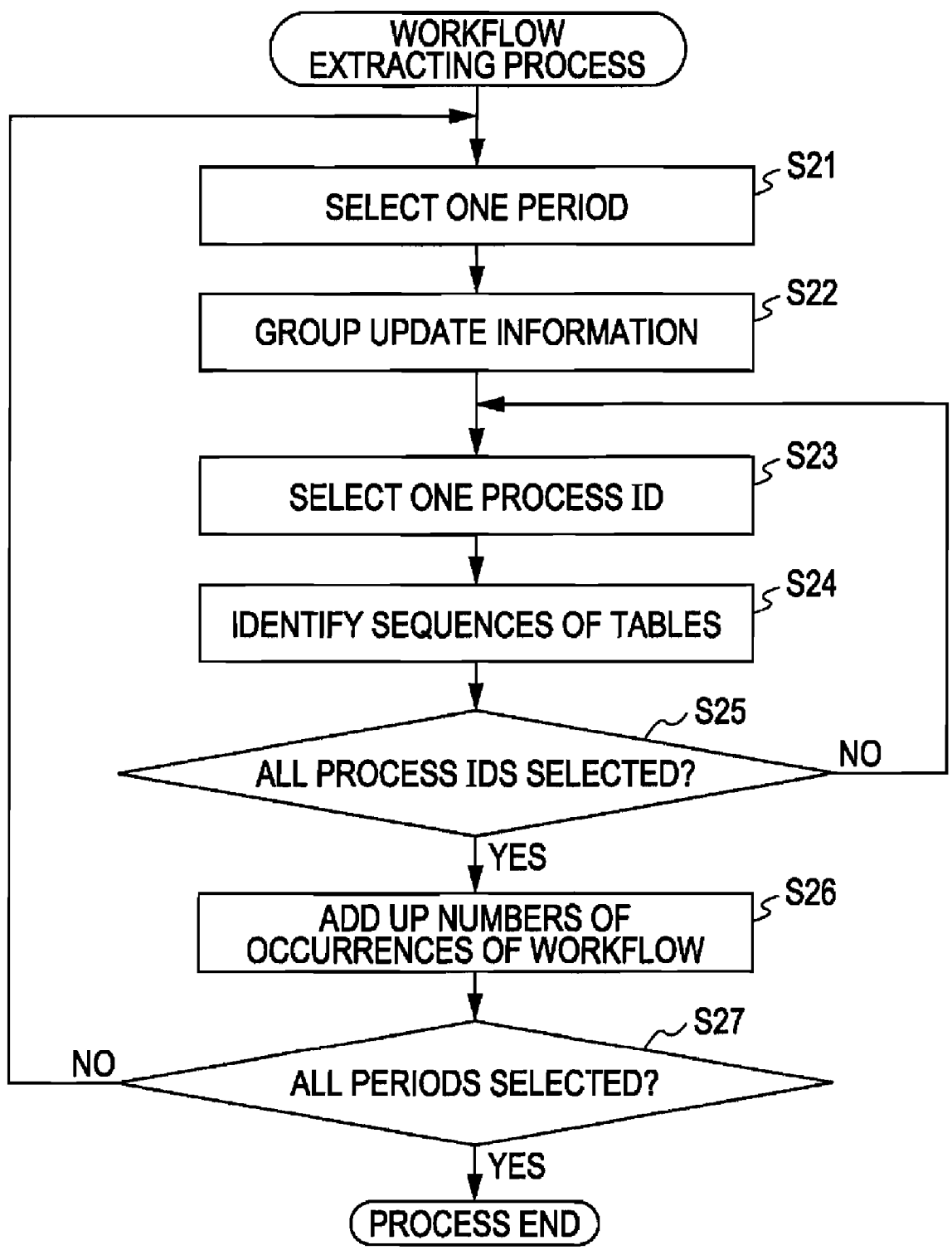
FIG. 10 is a flowchart of workflow extracting according to the first embodiment.

FIG. 10 is a flowchart showing the procedure of a workflow extracting process according to the first embodiment. Hereinbelow, the process shown in FIG. 10 will be described

[S21] The workflow extracting section 160 selects one unselected analysis unit period from among analysis unit periods. Then, the workflow extracting section 160 acquires an update information table corresponding to the selected analysis unit period from the update information storing section 110. Further, the workflow extracting section 160 generates within the work information storing section 130 a workflow table corresponding to the selected analysis unit period.

[S22] The workflow extracting section 160 groups together all the pieces of update information stored in the update information table acquired in S21 by process ID. For example, pieces of update information with a process ID "011" are grouped together.

[S23] The workflow extracting section 160 selects one unselected ID from among the process IDs that have been subjected to grouping in S22.

[S24] The workflow extracting section 160 sorts pieces of update information corresponding to the process ID selected in S23 in the order of earliest update time. Then, the workflow extracting section 160 arranges table names included in the update information in the sorted order.

[S25] The workflow extracting section 160 judges whether or not all the process IDs have been selected in S23. If it is judged that all the process IDs have been selected, the process is advanced to S26. If it is judged that an unselected process ID exists, the process is advanced to S23.

[S26] The workflow extracting section 160 adds up the sequences of table names obtained in S24, and identifies the number of occurrences of sequences with the same table names. Then, the workflow extracting section 160 stores workflow information including the sequences of table names and the numbers of occurrences into the workflow table created in S21.

[S27] The workflow extracting section 160 judges whether or not all the analysis unit periods have been selected in S21. If it is judged that all the analysis unit periods have been selected, the process ends. If it is judged that an unselected analysis unit period exists, the process is advanced to S21.

In this way, the workflow extracting section 160 groups pieces of update information together by process ID, and sorts pieces of update information by earliest update time within each individual group. Then, the workflow extracting section 160 identifies a sequence in which table names are arranged in the sorted order, and stores workflow information including the sequences of table names and the numbers of occurrences into the workflow table created within the work information storing section 130. The above-mentioned process is carried out for every analysis unit period. Thus, a workflow table for each analysis unit area is created within the work information storing section 130.

FIG. 11 is a diagram showing examples of the data structure of a workflow table. Workflow tables 131a, 131b, 131c, and so on shown in FIG. 11 are stored in the work information storing section 130. The workflow table 131a is a workflow table corresponding to an analysis unit period whose period ID is "#01". The workflow table 131b is a workflow table corresponding to an analysis unit period whose period ID is "#02". The workflow table 131c is a workflow table corresponding to an analysis unit period whose period ID is "#03".

The workflow tables 131a, 131b, 131c, and so on each include an item showing an activity sequence, and an item showing the number of occurrences. Pieces of information arranged in the transverse direction of individual items are associated with each other, constituting workflow information. Here, an activity refers to an update process of one table executed by the work program. Therefore, a sequence of table names refers to the execution order of activities. In the item showing the number of occurrences, a numerical value representing the number of occurrences of an activity sequence is set.

Workflow information is added to the workflow tables 131a, 131b, 131c by the workflow extracting section 160. For example, information indicating that the activity sequence is "reservation→arrangements→arrangement details→inspection", and that the number of occurrences is "350" is added.

Figure 12:
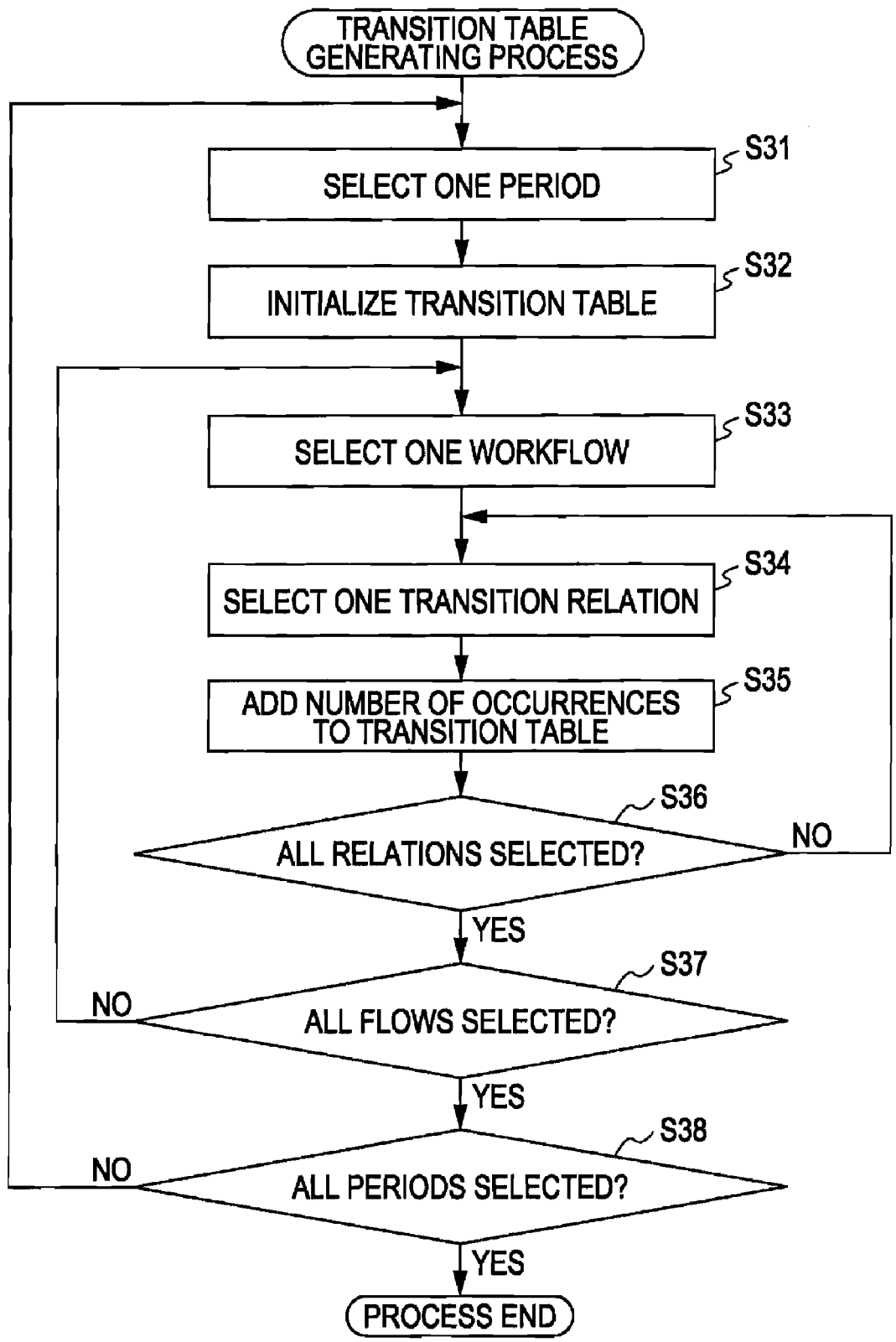
FIG. 12 is a flowchart of a transition table generating process.

FIG. 12 is a flowchart showing the procedure of a transition table generating process. Hereinbelow, the process shown in FIG. 12 will be described.

[S31] The transition table generating section 170 selects one unselected analysis unit period from among analysis unit periods. Then, the transition table generating section 170 acquires a workflow table corresponding to the selected analysis unit period from the work information storing section 130.

[S32] The transition table generating section 170 creates an activity transition table corresponding to the analysis unit period selected in S31, and after setting the numbers of occurrences of all the transition relations to 0 as the initial value, stores the activity transition table into the work information storing section 130.

[S33] The transition table generating section 170 selects one unselected piece of workflow information from among the pieces of workflow information stored in the workflow table acquired in S31, and identifies an activity sequence.

[S34] The transition table generating section 170 selects one unselected transition relation from among the transition relations included in the activity sequence identified in S33.

[S35] The transition table generating section 170 adds the number of occurrences of the workflow information selected in S33 to a value corresponding to the transition relation identified in S34 of the activity transition table.

[S36] The transition table generating section 170 judges whether or not all the transition relations included in the activity sequence have been selected in S34. If it is judged that all the transition relations have been selected, the process is advanced to S37. If it is judged that an unselected transition relation exists, the process is advanced to S34.

[S37] The transition table generating section 170 judges whether or not all the pieces of workflow information have been selected in S33. If it is judged that all the pieces of workflow information have been selected, the process is advanced to S38. If it is judged that an unselected piece of workflow information exists, the process is advanced to S38.

[S38] The transition table generating section 170 judges whether or not all the analysis unit periods have been selected in S31. If it is judged that all the analysis unit periods have been selected, the process ends. If it is judged that an unselected analysis unit period exists, the process is advanced to S31.

In this way, the transition table generating section 170 decomposes an activity sequence indicated by workflow information, calculates the number of instances of each individual transition relation, and writes the results into the activity transition table created within the work information storing section 130. The above-mentioned process is carried out for every analysis unit period. Thus, an activity transition table for each analysis unit period is created within the work information storing section 130.

FIG. 13 is a diagram showing examples of the data structure of an activity transition table. Activity transition tables 132a, 132b, 132c, and so on shown in FIG. 13 are stored in the work information storing section 130. The activity transition table 132a is an activity transition table corresponding to an analysis unit period whose period ID is "#01". The activity transition table 132b is an activity transition table corresponding to an analysis unit period whose period ID is "#02". The activity transition table 132c is an activity transition table corresponding to an analysis unit period whose period ID is "#03".

Table names corresponding to activities as transition sources are listed in the vertical direction of each of the activity transition tables 132a, 132b, 132c, and so on, and table names corresponding to activities as transition targets are listed in the horizontal direction. Numerical values indicating the numbers of instances of corresponding transition relations are set in the intersecting fields of the activities as transition sources and the activities as transition targets. Numerical values are set in the activity transition tables 132a, 132b, 132c, and so on by the transition table generating section 170. For example, the number of instances of a transition relation with "reservation" as the transition source and "arrangements" as the transition target is set as "431".

Figure 14:
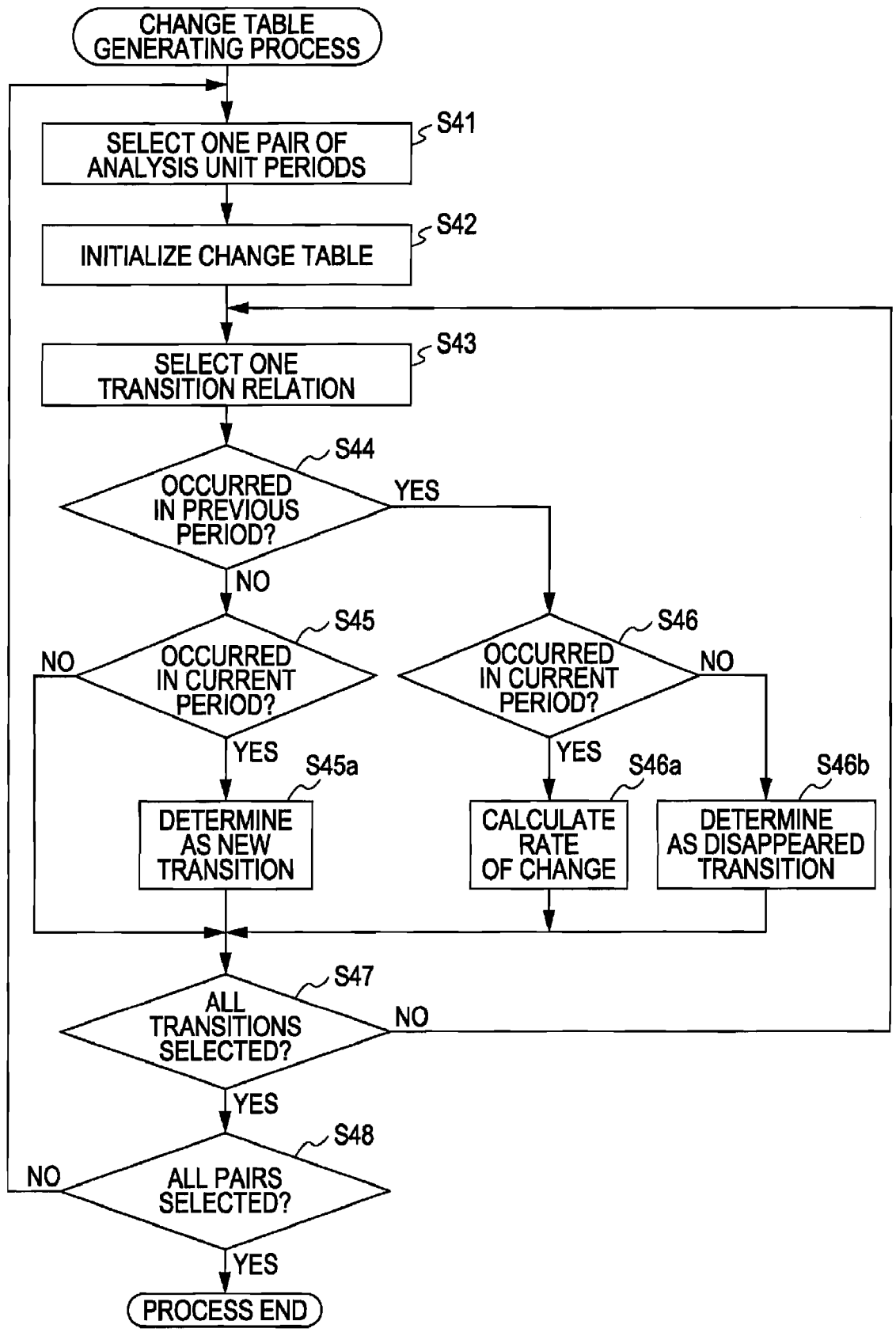
FIG. 14 is a flowchart of a change table generating process.

FIG. 14 is a flowchart showing the procedure of a change table generating process according to the first embodiment. Hereinbelow, the process shown in FIG. 14 will be described.

[S41] The change table generating section 180 selects one unselected pair from among pairs of adjacent analysis unit periods. Then, the change table generating section 180 acquires two activity transition tables corresponding to the selected pair of analysis unit periods from the work information storing section 130. It should be noted that in the following description, of the two analysis unit periods, the earlier one is referred to as the "previous period" and the later one is referred to as the "current period".

[S42] The change table generating section 180 creates an activity change table corresponding to the pair of analysis unit periods selected in S41, and stores the activity change table into the change information storing section 140.

[S43] The change table generating section 180 selects one unselected transition relation from among transition relations included in the activity transition tables of the previous and current periods acquired in S41.

[S44] The change table generating section 180 identifies the number of instances of the transition relation selected in S43 from the activity transition table of the previous period acquired in S41. Then, the change table generating section 180 judges whether or not the number of instances in the previous period is one or more, that is, whether or not that transition relation has occurred in the previous period. If it is judged that the transition relation has occurred, the process is advanced to S46. If it is judged that the transition relation has not occurred, the process is advanced to S45.

[S45] The change table generating section 180 identifies the number of instances of the transition relation selected in S43 from the activity transition table of the current period acquired in S41. Then, the change table generating section 180 judges whether or not the number of instances in the current period is one or more, that is, whether or not that transition relation has occurred in the current period. If it is judged that the transition relation has occurred, the process is advanced to S45a. If it is judged that the transition relation has not occurred, the process is advanced to S47.

[S45a] The change table generating section 180 determines the transition relation selected in S43 as being a transition relation that has newly occurred. Then, the change table generating section 180 sets a value to that effect in the corresponding field of the activity change table generated in S42.

[S46] The change table generating section 180 identifies the number of instances of the transition relation selected in S43 from the activity transition table of the current period acquired in S41. Then, the change table generating section 180 judges whether or not the number of instances in the current period is one or more, that is, whether or not that transition relation has occurred in the current period. If it is judged that the transition relation has occurred, the process is advanced to S46a. If it is judged that the transition relation has not occurred, the process is advanced to S46b.

[S46a] The change table generating section 180 calculates a rate of change in the number of instances on the basis of the number of instances in the previous period identified in S44 and the number of instances in the current period identified in S46. Specifically, the change table generating section 180 calculates a rate of change in percentage (%) terms by the following formula: (number of instances in the current period−number of instances in the previous period)/number of instances in the previous period×100. Then, the change table generating section 180 sets the calculated numerical value in the corresponding field of the activity change table generated in S42.

[S46b] The change table generating section 180 determines the transition relation selected in S43 as being a transition relation that has disappeared. Then, the change table generating section 180 sets a value to that effect in the corresponding field of the activity change table generated in S42.

[S47] The change table generating section 180 judges whether or not all the transition relations have been selected. If it is judged that all the transition relations have been selected, the process is advanced to S48. If it is judged that an unselected transition relation exists, the process is advanced to S43.

[S48] The change table generating section 180 judges whether or not all the pairs of analysis unit periods haven been selected in S41. If it is judged that all the pairs have been selected, the process ends. If it is judged that an unselected pair exists, the process is advanced to S41.

In this way, the change table generating section 180 compares the number of instances of each individual transition relation between adjacent analysis unit periods, and writes the results into the activity change table created within the change information storing section 140. The above-mentioned process is carried out for every analysis unit period. Thus, an activity change table for each analysis unit period is created within the change information storing section 140.

While in the above description a transition relation whose number of instances is 1 or more is determined as being a transition relation that has occurred, a transition relation whose number of instances is equal to or greater than a predetermined threshold may be determined as being a transition relation that has occurred. That is, a transition relation whose number of instances is less than a predetermined threshold may be regarded as a transition relation that has not occurred. Accordingly, it is possible to identify the general trend of change by eliminating transition relations that have occurred exceptionally. In this case, the administrator of the work analysis device 100 sets a threshold in advance.

FIG. 15 is a diagram showing examples of the data structure of an activity change table. Activity change tables 141*a*, 141*b*, 141*c*, and so on shown in FIG. 15 are stored in the change information storing section 140. The activity change table 141*a* is an activity change table corresponding to a pair of analysis unit periods whose period IDs are "#01" and "#02". The activity change table 141*b* is an activity change table corresponding to a pair of analysis unit periods whose period IDs are "#02" and "#03". The activity change table 141*c* is an activity change table corresponding to a pair of analysis unit periods whose period IDs are "#03" and "#04".

Table names corresponding to activities as transition sources are listed in the vertical direction of each of the activity transition tables 141*a*, 141*b*, 141*c*, and so on, and table names corresponding to activities as transition targets are listed in the horizontal direction. Values indicating changes in the corresponding transition relations are set in the intersecting fields of the activities as transition sources and the activities as transition targets. Here, "new" indicates that a transition relation has newly occurred. "Disappeared" indicates that a transition relation has disappeared. Blanks indicate no change. Values are set in the activity transition tables 141*a*, 141*b*, 141*c*, and so on by the change table generating section 180.

Next, a description will be given of a display screen displayed on the monitor 11 by the analysis result displaying section 190 after completion of a change analysis process.

FIG. 16 is a diagram showing an example of a selection screen for selecting a display method according to the first embodiment. A display screen (user interface) 51 shown in FIG. 16 is displayed on the monitor 11 by the analysis result displaying section 190 immediately after completion of a change analysis process. The display screen 51 includes three selection items for selecting the method of displaying analysis results, and an enter button for confirming the selected display method.

A first selection item indicates a display method of displaying a list of transition relations with marked changes in the number of instances. A second selection item indicates a display method of visually displaying changes of transition relations between two specified analysis unit periods. A third selection item indicates a display method of performing graphic display of time-series variation in the number of instances of a specified transition relation. When one of the three selection items is selected through an operation input by the user and the enter button is pressed, the analysis result displaying section 190 displays analysis results in accordance with the selected display method.

FIG. 17 is a diagram showing an example of the display screen of analysis results according to the first display method. A display screen 52 shown in FIG. 17 is displayed on the monitor 11 by the analysis result displaying section 190 when the first selection item is selected in the display screen 51. The display screen 52 includes an item indicating transition relations that have newly occurred, an item indicating transition relations that have disappeared, an item indicating transition relations whose numbers of instances have increased by 30 percent or more, and an item indicating transition relations whose numbers of instances have decreased by 30 percent or more. In each of the items, a list of correspondences between an analysis unit period during which such a change has occurred and a transition relation that has changed is displayed.

For example, information "February 2006: arrangement details→arrangement details" is displayed in the item indicating transition relations that have newly occurred. This refers to that a process of successively updating a table "arrangement details" has newly occurred between January 2006 (the "previous period" of the pair of analysis unit periods) and February 2006 (the "current period" of the pair of analysis unit periods). The displayed contents of the display screen 52 are generated by extracting transition relations that match the conditions of the individual items, from the activity change table stored in the change information storing section 140.

Figure 18:
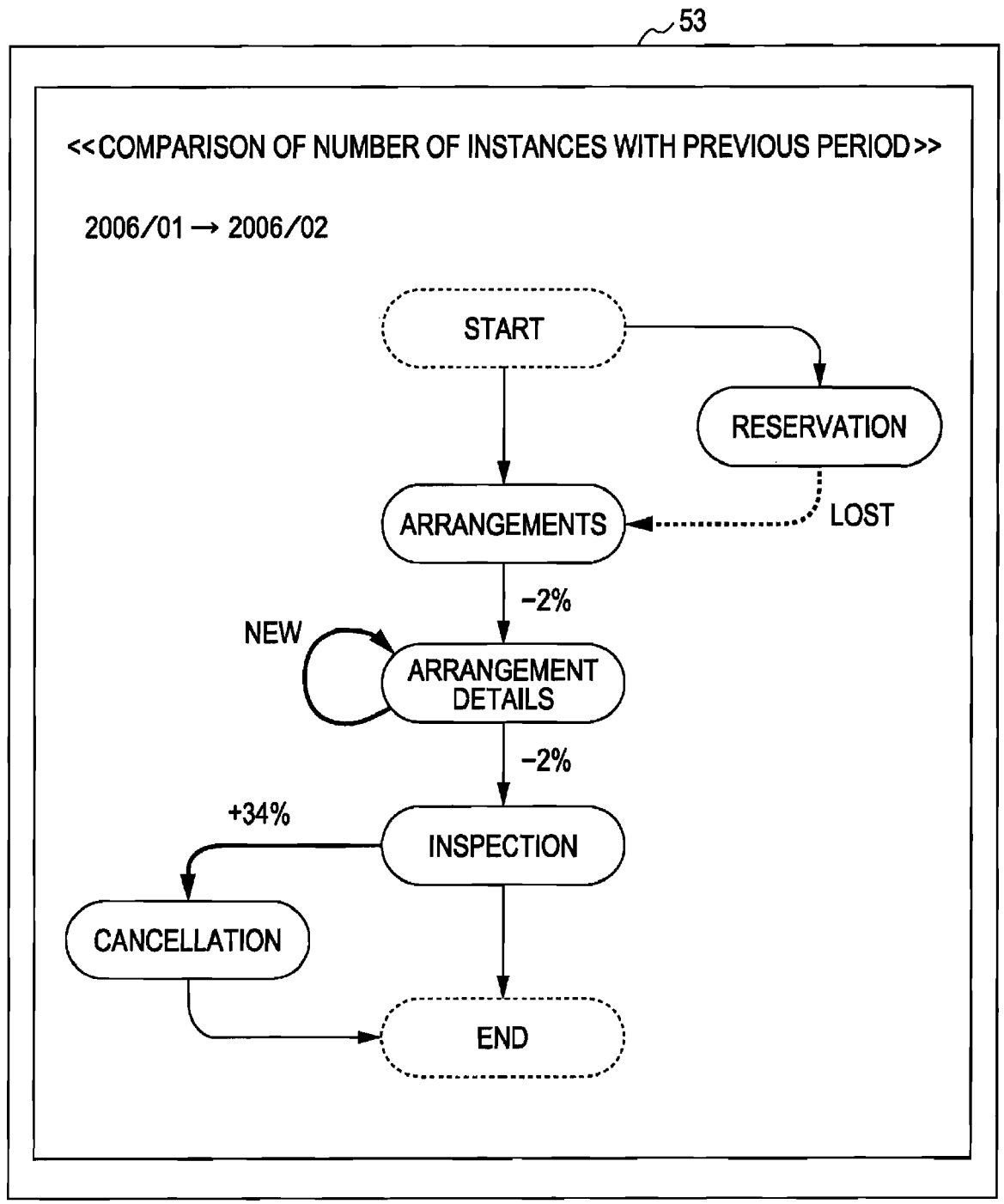
FIG. 18 is a diagram showing an example of a display screen for displaying analysis results according to a second display method.

FIG. 18 is a diagram showing an example of the display screen of analysis results according to the second display method. A display screen 53 shown in FIG. 18 is displayed on the monitor 11 by the analysis result displaying section 190 when the second selection item is selected and a pair of analysis unit periods are specified in the display screen 51. The display screen 53 displays a workflow diagram with a table name (data activity) as a node and a transition relation as a link.

Here, information indicating a change is added to the link to a transition relation that has undergone a change within a specified period. Specifically, either one of "new", "disappeared", and a numerical value indicating a rate of change is added. Further, the links to a transition relation that has newly occurred, a transition relation that has disappeared, a transition relation whose number of instances has increased or decreased by 30 percent or more, are highlighted in bold type.

For example, the display screen 53 shown in FIG. 18 indicates that a transition relation with "reservation" as the transition source and "arrangements" as the transition target existed in January 2006 but disappeared in February 2006. Further, the display screen 53 indicates that a transition relation whose transition source and transition target are "arrangement details" did not exist in January 2006 but newly occurred in February 2006. Further, the display screen 53 indicates that the number of instances of a transition relation with "inspection" as the transition source and "cancellation" as the transition target has increased by 34 percent in February 2006 relative to January 2006.

The displayed contents of the display screen 53 are generated from the workflow information stored in the work information storing section 130 and the activity change table stored in the change information storing section 140. That is, the analysis result displaying section 190 acquires two workflow tables corresponding to a pair of specified analysis unit periods from the work information storing section 130, and generates a workflow diagram representing all the activity sequences described in the workflow table. Thereafter, the analysis result displaying section 190 acquires an activity change table corresponding to the pair of specified analysis unit periods from the change information storing section 140, and adds information showing changes of transition relations to the workflow diagram for display.

Figure 19:
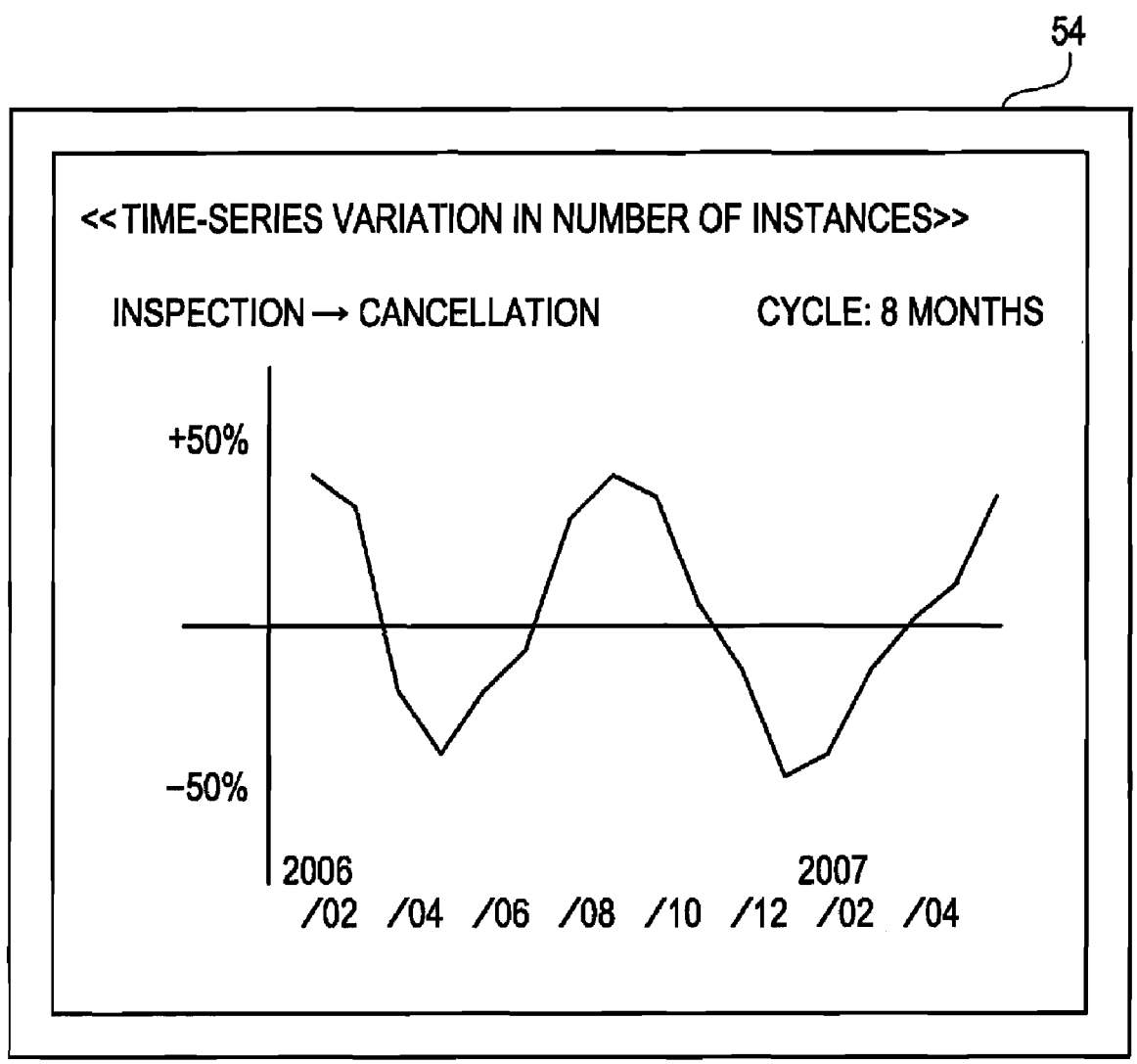
FIG. 19 is a diagram showing an example of a display screen for displaying analysis results according to a third display method.

FIG. 19 is an example of the display screen of analysis results according to the third display method. A display screen 54 shown in FIG. 19 is displayed on the monitor 11 by the analysis result displaying section 190 when the third selection item is selected and a transition relation is specified in the display screen 51 by the user. The display screen 54 displays a line graph with a rate of change taken along the vertical axis and time taken along the horizontal axis. The line graph is generated by extracting values in the field of a specified transition relation from individual activity change tables stored in the change information storing section 140, and arranging the values in time series.

The display screen 54 also displays information indicating the general trend in the change of the number of instances of a transition relation. Specifically, "increasing trend" is displayed as the general trend if a period during which the rate of change in the number of instances is positive has been continuing. "Decreasing trend" is displayed as the general trend if a period during which the rate of change in the number of instances is negative has been continuing. Further, if a period during which the rate of change is positive and a period during which the rate of change is negative appear alternately, the cycle is calculated by statistical processing and displayed. In the example shown in FIG. 19, the rate of change varies with a cycle of 8 months.

According to the first display method and the second display method mentioned above, transition relations whose numbers of instances have increased by 30 percent or more and transition relations whose numbers of instances have decreased by 30 percent or more are determined as transition relations with marked changes in the number of instances. However, it is also possible to change the threshold as appropriate. In this case, the administrator or user of the work analysis device 100 sets a threshold in advance prior to display of analysis results.

By using the work analysis device 100 as described above, the user can easily grasp what kind of changes have occurred during the operating period of the computer system and when.

In particular, since individual analysis unit periods can be set flexibly, the user can use the work analysis device 100 for various analytical purposes. For example, it is possible to set each one analysis unit period as one year to observe long-term changes, or to set each one analysis unit period as one week to observe short-term changes. Further, analysis unit periods may not necessarily be mutually sequential, and it is also possible to observe secular changes in workflow in a specific season. Further, the analysis periods may be determined and/or set by a user as described and/or automatically according to application criteria.

Since the work analysis device 100 can display a list of transitions with marked changes, the contents of work that require consideration can be easily identified even when the overall workflow is extremely complicated. Further, the contents of changes can be displayed in association with a workflow diagram, thus making it easier to grasp the locations where changes have occurred with respect to the entire work. Further, the time-series variation in the number of instances of a transition relation can be displayed in the form of a graph, thus making it easier to grasp the trend of change (increasing trend, decreasing trend, cyclic, or the like).

Therefore, the manager or system administrator can appropriately consider a review of work contents, relocation of resources, and the like in accordance with changes in workflow. Specifically, this may involve setting up a work manual for a work activity corresponding to the transition relation that has newly occurred, and allocating more throughput of the computer system to a work activity corresponding to the transition relation whose number of instances has increased. Further, this may also involve predicting the number of instances of a transition relation in the future from the trend of change, and increasing the throughput of the computer system in advance. Further, this may also involve investigating the casual relation between the period in which a change occurred and work performance in order to consider a workflow for accomplishing better performance.

Second Embodiment

Next, a second embodiment will be described. According to the second embodiment, in addition to changes in the number of instances of a transition relation, changes in the time required for performing a work activity corresponding to the transition relation are analyzed. The following description will mainly focus on differences from the above-described first embodiment, and description of similar features is omitted.

A system configuration according to the second embodiment is the same as that of the first embodiment shown in FIG. 2. It should be noted, however, that some of the processing functions of the work analysis device are different from that of the first embodiment. Hereinbelow, it is assumed that a work analysis device 100a corresponds to the work analysis device 100 according to the first embodiment.

Figure 20:
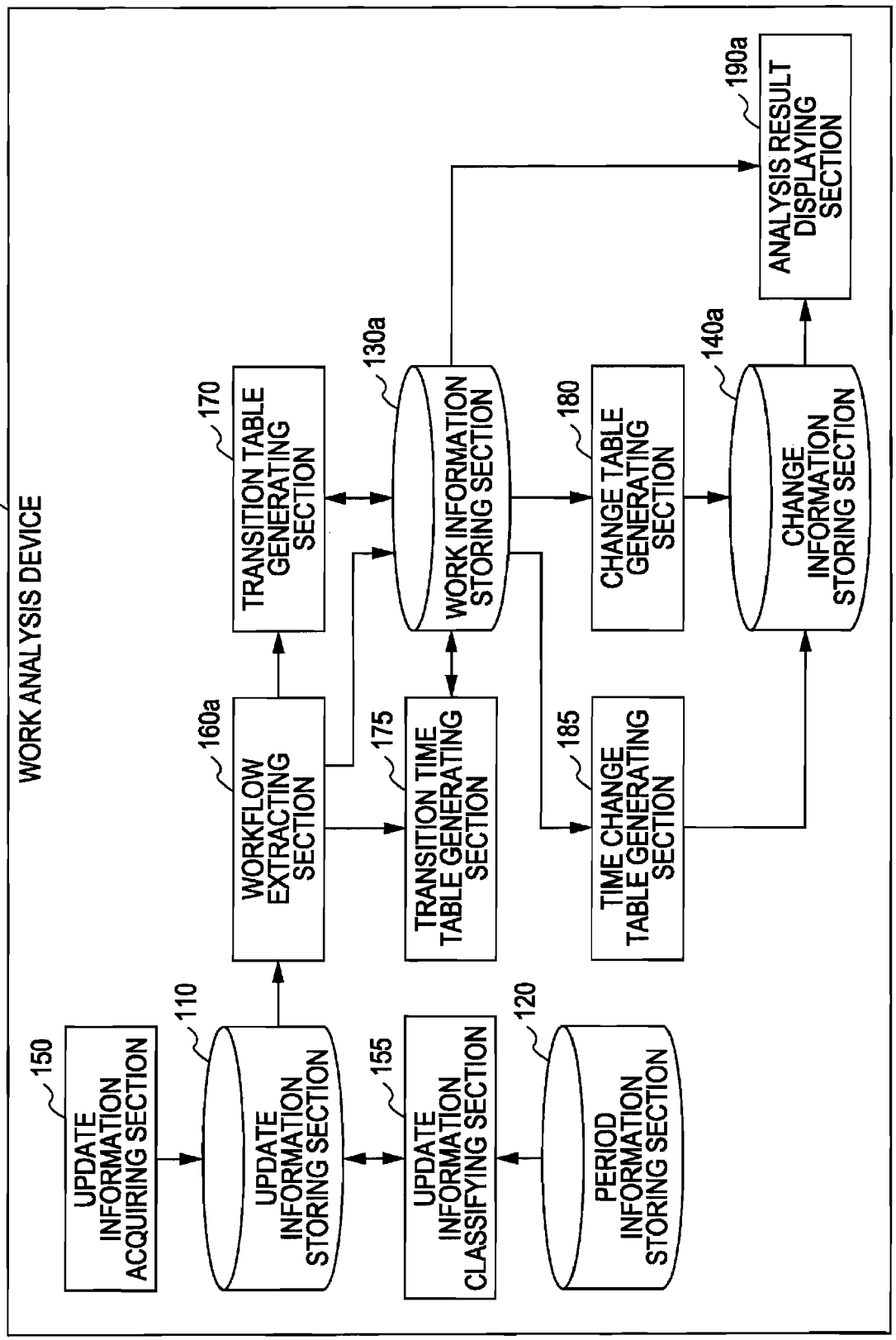
FIG. 20 is a block diagram showing the functions of a work analysis device according to a second embodiment.

FIG. 20 is a block diagram showing the functions of the work analysis device according to the second embodiment. The work analysis device 100a has an update information storing section 110, a period information storing section 120, a work information storing section 130a, a change information storing section 140a, an update information acquiring section 150, an update information classifying section 155, a workflow extracting section 160a, a transition table generating section 170, a transition time table generating section 175, a change table generating section 180, a time change table generating section 185, and an analysis result displaying section 190a. The processing functions of the update information storing section 110, the period information storing section 120, the update information acquiring section 150, the update information classifying section 155, the transition table generating section 170, and the change table generating section 180 are the same as those of the first embodiment.

The work information storing section 130a stores elapsed time information in addition to the workflow information and the activity transition table described in the first embodiment. The elapsed time refers to the time required until updating of the table as a transition target after updating of the table as a transition source. Elapsed time information is information generated halfway through an analysis process. In the work information storing section 130a, elapsed time information is stored for each classified analysis unit period.

The work information storing section 130a also stores an activity transition time table for each analysis unit period. An activity transition time table shows a list of transition times. A transition time refers to a statistical value of the time required until updating of the table as a transition target after updating of the table as a transition source. That is, a transition time is a value obtained by statistically processing an elapsed time. Examples of statistical value include a mean value, a maximum value, a minimum value, and/or a standard deviation. For example, an activity transition time table describes such information that the mean of the times required from updating of a table "reservation" until the updating of a table "arrangements" is 4 hours and 32 minutes. An activity transition time table is information that is generated halfway through an analysis process.

The change information storing section 140a stores an activity time change table in addition to the activity change table described in the first embodiment. An activity time change table shows changes in transition time. An activity time change table describes information indicating a rate of change in transition time for each transition relation. For example, activity time change table is created for every pair of adjacent analysis unit periods. That is, in a case where N analysis unit periods are defined by the period information, N-1 activity time change tables are created. An activity time change table is information that is generated as a result of an analysis process.

Upon completion of the processing by the update information classifying section 155, the workflow extracting section 160a generates workflow information on the basis of the update information stored in the update information storing section 110. The workflow extracting section 160a also generates elapsed time information in the course of generating the workflow information, and stores the elapsed time information into the work information storing section 130a. The above-mentioned process is carried out independently for every analysis unit period.

Upon completion of the processing by the change table generating section 180, the transition time table generating section 175 generates an activity transition time table on the basis of the elapsed time information stored in the work information storing section 130a. Specifically, the transition time table generating section 175 groups together pieces of elapsed time information having the same pair of a table as the transition source and a table as the transition target, and performs statistical processing of the elapsed time for every group to calculate the transition time. Then, the transition time table generating section 175 stores the generated activity transition time table into the work information storing section 130a. It should be noted that the above-mentioned process is carried out independently for every analysis unit period.

Upon completion of the processing by the transition time table generating section 175, the time change table generating section 185 generates an activity time change table on the basis of the activity transition time table stored in the work information storing section 130a. Specifically, for example, the time change table generating section 185 compares the activity transition time table between adjacent analysis unit periods, and identifies changes in the transition time of each individual transition relation to generate the activity time change table. Then, the time change table generating section 185 stores the generated activity time change table into the change information storing section 140a.

Upon completion of the processing by the time change table generating section 185, the analysis result displaying section 190a displays analysis results on the monitor 11 on the basis of the workflow information stored in the work information storing section 130a and the activity change table and the activity time change table stored in the change information storing section 140a. At this time, the analysis result displaying section 190a urges the user of the work analysis device 100a to select the display method of analysis results, and performs display in accordance with the selected display method.

Figure 21:
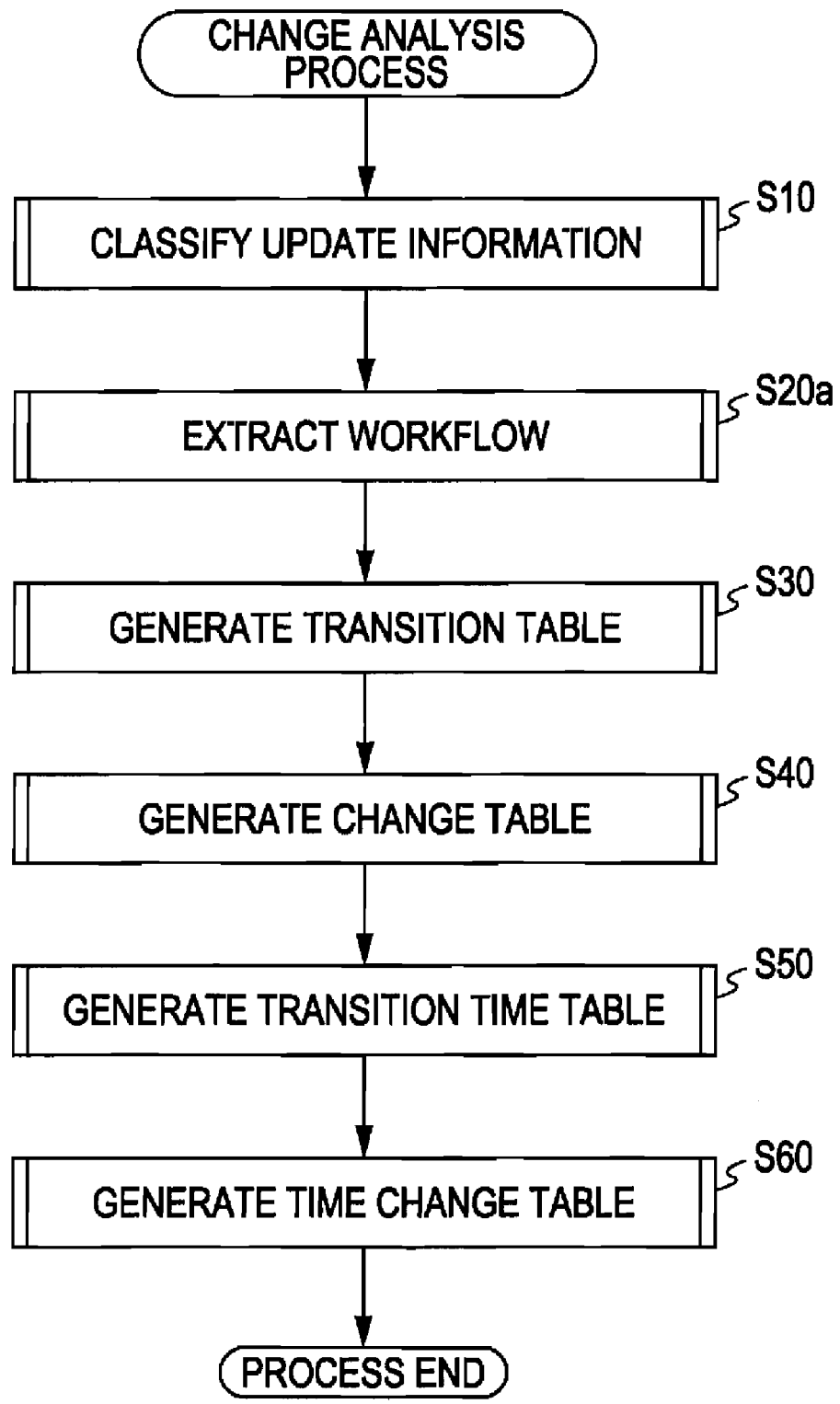
FIG. 21 is a flowchart of a change analysis process according to the second embodiment.

FIG. 21 is a flowchart showing the procedure of a change analysis process according to the second embodiment. Hereinbelow, the process shown in FIG. 21 will be described.

[S10] The update information classifying section 155 acquires update information from the update information storing section 110, and also acquires period information from the period information storing section 120. Then, the update information classifying section 155 classifies the update information by each analysis unit period, and stores the classification results into the update information storing section 110.

[S20a] The workflow extracting section 160a acquires the update information from the update information storing section 110 and generates workflow information for every analysis unit period. Then, the workflow extracting section 160a stores the generated workflow information into the work information storing section 130a. Also, the workflow extracting section 160a generates elapsed time information together with the workflow information, and stores the elapsed time information into the work information storing section 130a.

[S30] The transition table generating section 170 acquires the workflow information from the work information storing section 130a, and generates an activity transition table for each analysis unit period. Then, the transition table generating section 170 stores the generated activity transition table into the work information storing section 130a.

[S40] The change table generating section 180 acquires the activity transition table from the work information storing section 130a, and generates an activity change table for every pair of analysis unit periods. Then, the change table generating section 180 stores the generated activity change table into the change information storing section 140a.

[S50] The transition time table generating section 175 acquires elapsed time information from the work information storing section 130a, and generates an activity transition time table for each analysis unit period. Then, the transition time table generating section 175 stores the generated activity transition time table into the work information storing section 130a.

[S60] The time change table generating section 185 acquires the activity transition time table from the work information storing section 130a, and generates an activity time change table for every pair of analysis unit periods. Then, the time change table generating section 185 stores the generated activity time change table into the change information storing section 140a.

The contents of the update information classifying process executed in S10, the transition table generating process executed in S30, and the change table generating process executed in S40 mentioned above are the same as those of the first embodiment. Hereinbelow, a description will be given of the details of a workflow extracting process executed in S20a, a transition time table generating process executed in S50, and a time change table generating process executed in S60 which are different from those of the first embodiment.

Figure 22:
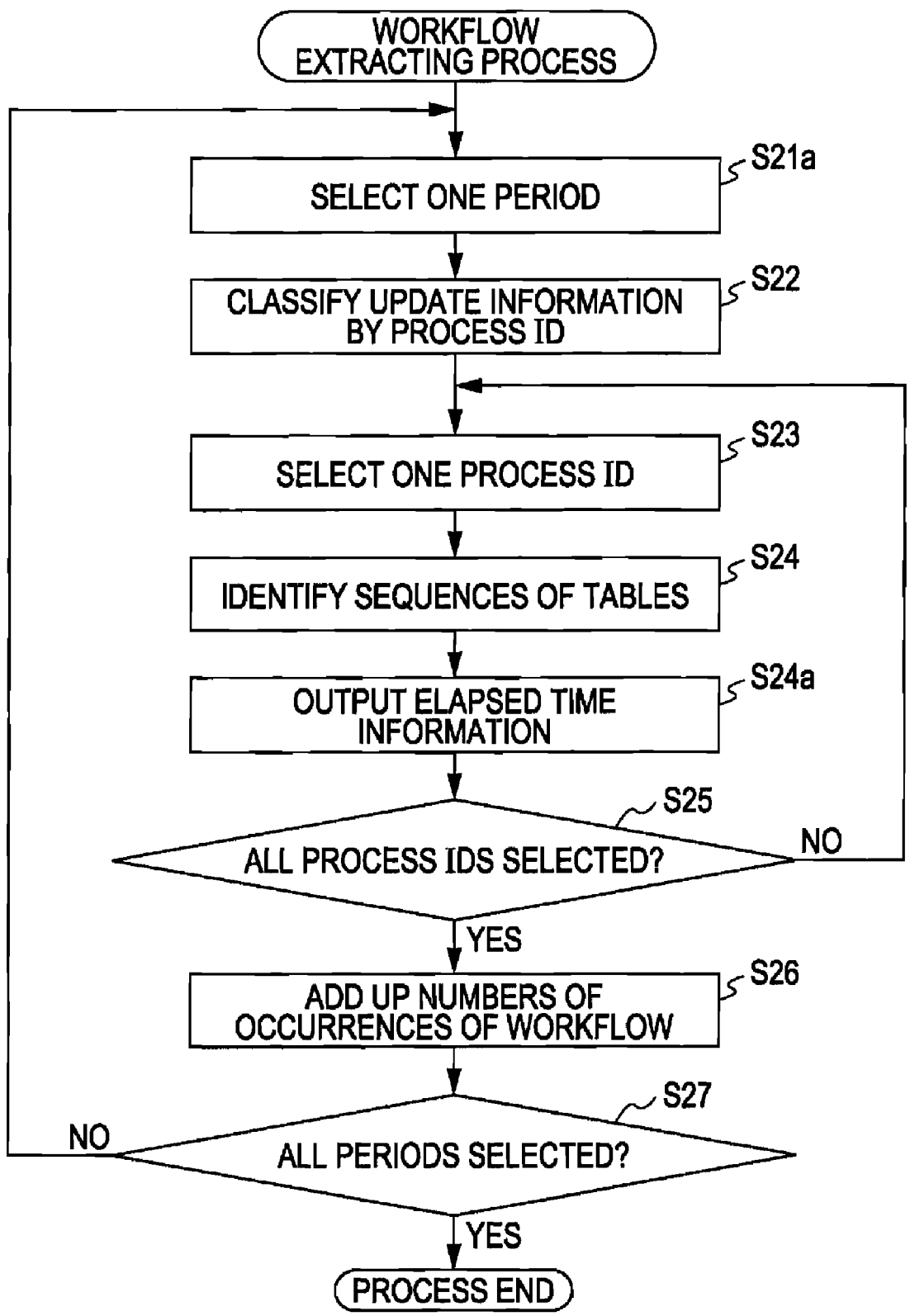
FIG. 22 is a flowchart of a workflow extracting process according to the second embodiment.

FIG. 22 is a flowchart showing the procedure of a workflow extracting process according to the second embodiment. Hereinbelow, the process shown in FIG. 22 will be described.

[S21a] The workflow extracting section 160a selects one unselected analysis unit period from among analysis unit periods. Then, the workflow extracting section 160a acquires an update information table corresponding to the selected analysis unit period from the update information storing section 110. Further, the workflow extracting section 160a generates within the work information storing section 130a a workflow table and an elapsed time information table corresponding to the selected analysis unit period.

[S22] The workflow extracting section 160a groups all the pieces of update information stored in the update information table acquired in S21a by process ID.

[S23] The workflow extracting section 160a selects one unselected ID from among the process IDs that have been subjected to grouping in S22.

[S24] The workflow extracting section 160a sorts pieces of update information corresponding to the process ID selected in S23 by earliest update time. Then, the workflow extracting section 160a arranges table names included in the pieces of update information in the sorted order.

[S24a] The workflow extracting section 160a generates elapsed time information on the basis of the list of pieces of update information sorted by update time obtained in S24. Specifically, for every pair of adjacent pieces of update information, the workflow extracting section 160a calculates the difference in update time between the two adjacent pieces of update information as elapsed time. Then, the workflow extracting section 160a generates elapsed time information including the table name of a table as the transition source, the table name of a table as the transition target, and the elapsed time. Thereafter, the workflow extracting section 160a adds the elapsed time information to the elapsed time information table generated in S21a.

[S25] The workflow extracting section 160a judges whether or not all the process IDs have been selected in S23. If it is judged that all the process IDs have been selected, the process is advanced to S26. If it is judged that an unselected process ID exists, the process is advanced to S23.

[S26] The workflow extracting section 160a adds up the sequences of table names obtained in S24, and identifies the number of occurrences of sequences with the same table names. Then, the workflow extracting section 160a stores workflow information including the sequences of table names and the numbers of occurrences into the workflow table created in S21a.

[S27] The workflow extracting section 160a judges whether or not all the analysis unit periods have been selected in S21a. If it is judged that all the analysis unit periods have been selected, the process ends. If it is judged that an unselected analysis unit period exists, the process is advanced to S21a.

In this way, as in the first embodiment, the workflow extracting section 160a generates workflow information and stores the workflow information into a workflow table. Also, the workflow extracting section 160a generates elapsed time information and stores the elapsed time information into an elapsed time information table. A workflow table and an elapsed time information table for each analysis unit period are thus created within the work information storing section 130a.

FIG. 23 is a diagram showing examples of the data structure of an elapsed time information table. Elapsed time information tables 133a, 133b, 133c, and so on shown in FIG. 23 are stored in the work information storing section 130a. The elapsed time information table 133a is an elapsed time information table corresponding to an analysis unit period whose period ID is "#01". The elapsed time information table 133b is an elapsed time information table corresponding to an analysis unit period whose period ID is "#02". The elapsed time information table 133c is an elapsed time information table corresponding to an analysis unit period whose period ID is "#03".

The elapsed time information tables 133a, 133b, 133c, and so on each include an item showing a transition source, an item showing a transition target, and an item showing elapsed time. Pieces of information arranged in the transverse direction of individual items are associated with each other. In the item showing a transition source, the table name of a table as the transition source is set. In the item showing a transition target, the table name of a table as the transition target is set. In the item showing elapsed time, a value indicating the time required until a table as the transition target was updated after updating a table as the transition source is set.

Elapsed time information is added to the elapsed time information tables 133a, 133b, 133c, and so on by the workflow extracting section 160a. For example, information indicating that the transition source is "reservation", the transition target is "arrangements", and the elapsed time is "4:21" (4 hours and 21 minutes) is added.

Figure 24:
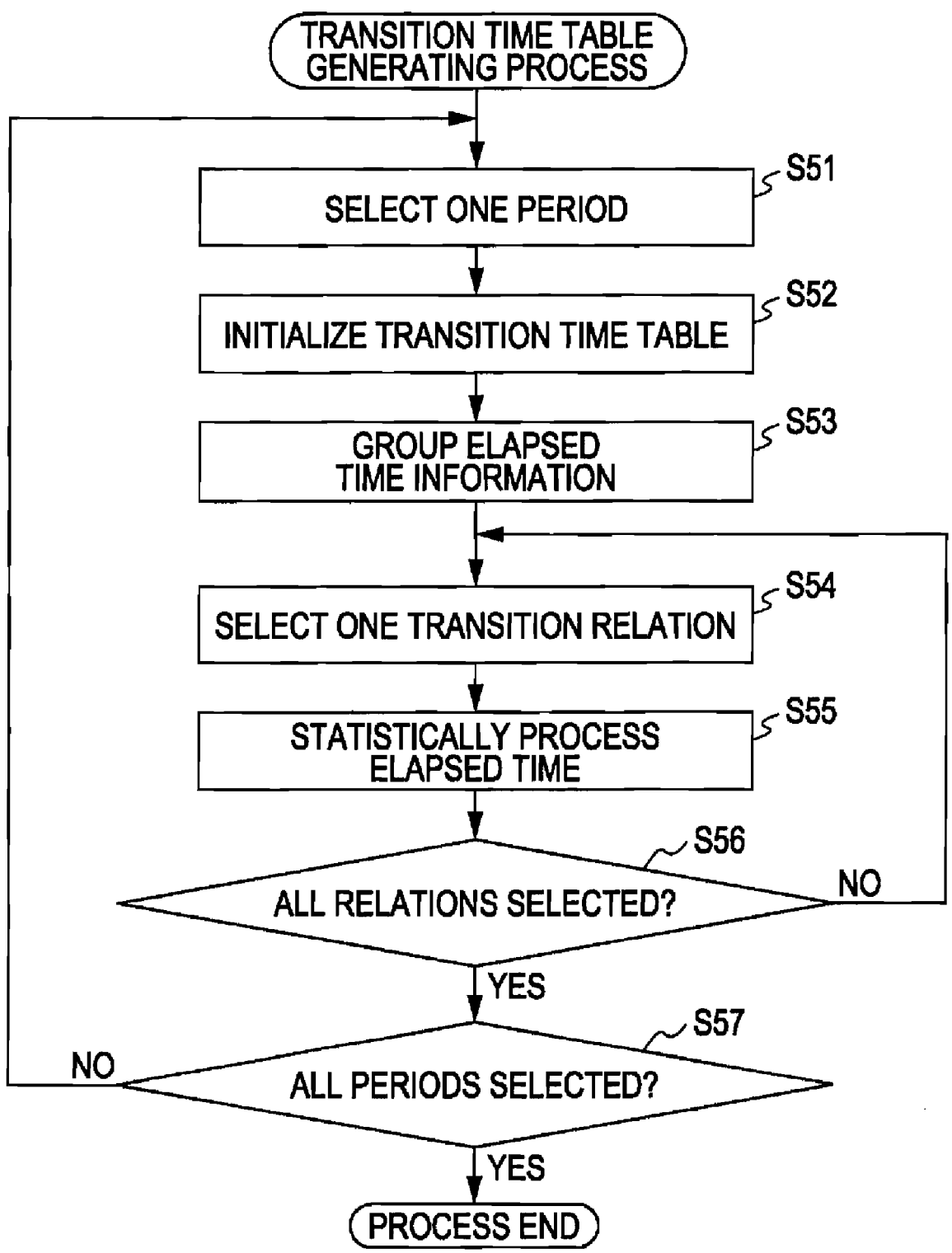
FIG. 24 is a flowchart of a transition time table generating process.

FIG. 24 is a flowchart showing the procedure of a transition time table generating process. Hereinbelow, the process shown in FIG. 24 will be described.

[S51] The transition time table generating section 175 selects one unselected analysis unit period from among analysis unit periods. Then, the transition time table generating section 175 acquires an elapsed time information table corresponding to the selected analysis unit period from the work information storing section 130a.

[S52] The transition time table generating section 175 creates an activity transition time table corresponding to the analysis unit period selected in S51, and after setting the numbers of occurrences of all the transition relations to 0 as the initial value, stores the activity transition time table into the work information storing section 130a.

[S53] The transition time table generating section 175 groups all the pieces of elapsed time information, which are stored in the elapsed time table information table acquired in S51, by transition relation. That is, pieces of elapsed time information in which both a table as the transition source and a table as the transition target are the same are grouped together.

[S54] The transition time table generating section 175 selects one unselected transition relation from among the transition relations that were subjected to grouping in S53.

[S55] The transition time table generating section 175 performs statistical processing of the elapsed time corresponding to the transition relation selected in S54 to calculate transition time. For example, the transition time table generating section 175 calculates the mean, maximum value, minimum value, and standard deviation of the elapsed time. Then, the transition time table generating section 175 sets the value of the calculated transition time into a field of the activity transition time table corresponding to the transition relation selected in S54.

[S56] The transition time table generating section 175 judges whether or not all the transition relations have been selected in S54. If it is judged that all the transition relations have been selected, the process is advanced to S57. If it is judged that an unselected transition relation exists, the process is advanced to S54.

[S57] The transition time table generating section 175 judges whether or not all the analysis unit periods have been selected in S51. If it is judged that all the analysis unit periods have been selected, the process ends. If it is judged that an unselected analysis unit period exists, the process is advanced to S51.

In this way, the transition time table generating section 175 groups pieces of elapsed time information together by transition relation, calculates the transition time of each individual transition relation, and writes the results into the activity transition time table created within the work information storing section 130a. The above-mentioned process is carried out for every analysis unit period. An activity transition time table for each analysis unit period is thus created within the work information storing section 130a. For the simplicity of description, in the following, only the mean of elapsed times is regarded as the transition time.

FIG. 25 is a diagram showing examples of the data structure of an activity transition time table. Activity transition time tables 134a, 134b, 134c, and so on shown in FIG. 25 are stored in the work information storing section 130a. The activity transition time table 134a is an activity transition time table corresponding to an analysis unit period whose period ID is "#01". The activity transition time table 134b is an activity transition time table corresponding to an analysis unit period whose period ID is "#02". The activity transition time table 134c is an activity transition time table corresponding to an analysis unit period whose period ID is "#03".

Table names corresponding to activities as transition sources are listed in the vertical direction of each of the activity transition time tables 134a, 134b, 134c, and so on, and table names corresponding to activities as transition targets are listed in the horizontal direction. A value indicating the transition time (in this example, the mean of elapsed times) of a corresponding transition relation is set in each of the intersecting fields of the activities as transition sources and the activities as transition targets. It should be noted that "0" is set in the fields of transition relations that have not occurred.

Values are set in the activity transition time tables 134a, 134b, 134c, and so on by the transition time table generating section 175. For example, the transition time of a transition relation with "reservation" as the transition source and "arrangements" as the transition target is set as "4:32".

Figure 26:
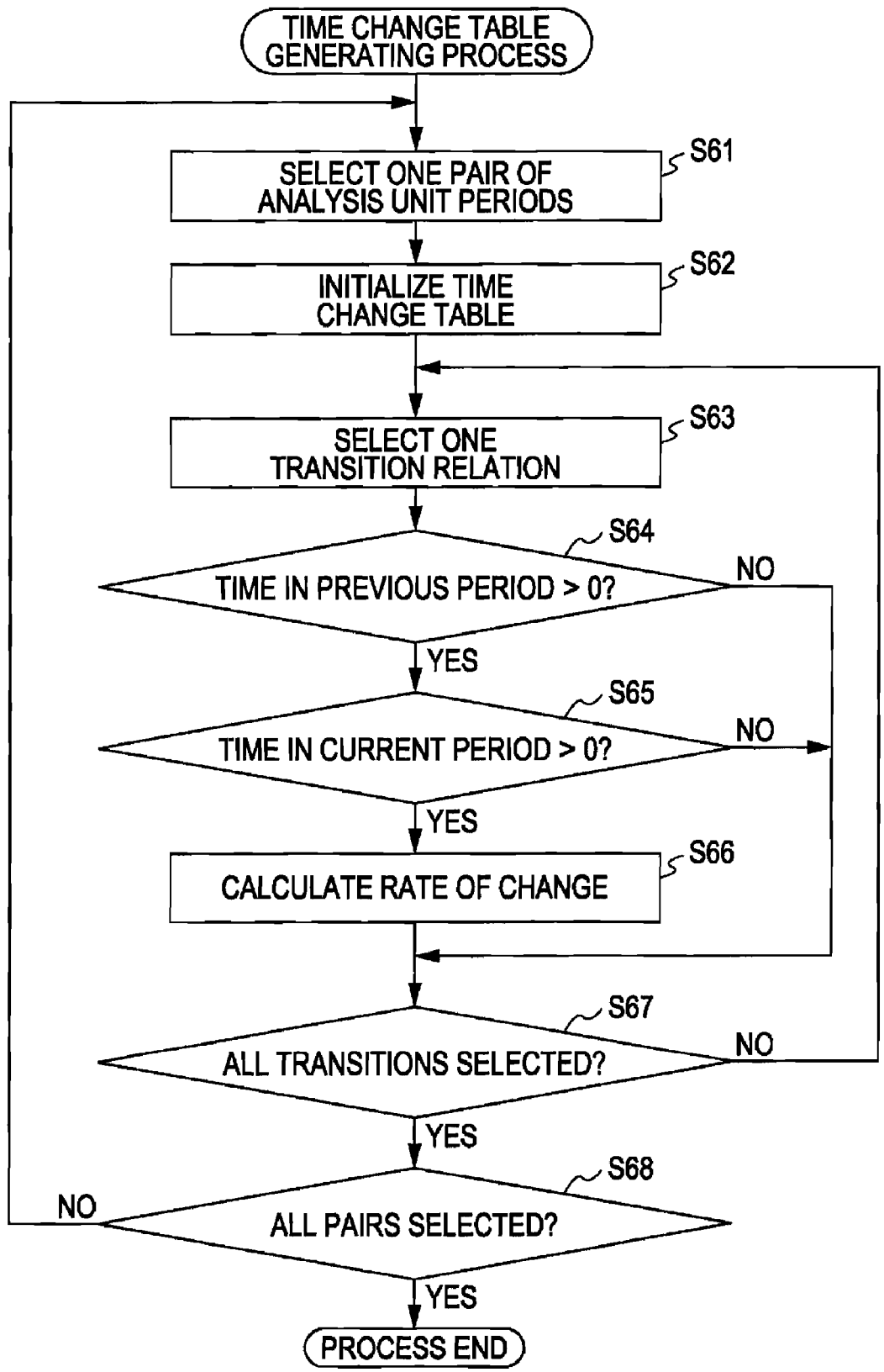
FIG. 26 is a flowchart of a time change table generating process.

FIG. 26 is a flowchart showing the procedure of a time change table generating process according to the second embodiment. Hereinbelow, the process shown in FIG. 26 will be described.

[S61] The time change table generating section 185 selects one unselected pair from among pairs of adjacent analysis unit periods. Then, the time change table generating section 185 acquires two activity transition time tables corresponding to the selected pair of analysis unit periods from the work information storing section 130a. It should be noted that in the following description, of the two analysis unit periods, the earlier one is referred to as the "previous period" and the later one is referred to as the "current period".

[S62] The time change table generating section 185 creates an activity time change table corresponding to the pair of analysis unit periods selected in S61, and stores the activity time change table into the change information storing section 140a.

[S63] The time change table generating section 185 selects one unselected transition relation from among transition relations included in the activity transition time tables of the previous and current periods acquired in S61.

[S64] The time change table generating section 185 identifies the transition time of the transition relation selected in S63, from the activity transition time table of the previous period acquired in S61. Then, the time change table generating section 185 judges whether or not the value of the transition time in the previous period is positive, that is, whether or not that transition relation has occurred in the previous period. If it is determined that the transition relation has occurred, the process is advanced to S65. If it is determined that the transition relation has not occurred, the process is advanced to S67.

[S65] The time change table generating section 185 identifies the transition time of the transition relation selected in S63, from the activity transition time table of the current period acquired in S61. Then, the time change table generating section 185 judges whether or not the value of the transition time in the current period is positive, that is, whether or not that transition relation has occurred in the current period. If it is determined that the transition relation has occurred, the process is advanced to S66. If it is determined that the transition relation has not occurred, the process is advanced to S67.

[S66] The time change table generating section 185 calculates a rate of change in transition time on the basis of the transition time in the previous period identified in S64 and the transition time in the current period identified in S66. Specifically the time change table generating section 185 calculates a rate of change in percentage (%) terms by the following formula: (transition time in the current period−transition time in the previous period)/transition time in the previous period× 100. Then, the time change table generating section 185 sets the calculated numerical value in the corresponding field of the activity time change table generated in S62.

[S67] The time change table generating section 185 judges whether or not all the transition relations have been selected. If it is judged that all the transition relations have been selected, the process is advanced to S68. If it is judged that an unselected transition relation exists, the process is advanced to S63.

[S68] The time change table generating section 185 judges whether or not all the pairs of analysis unit periods haven been selected in S61. If it is judged that all the pairs have been selected, the process ends. If it is judged that an unselected pair exists, the process is advanced to S61.

In this way, the time change table generating section 185 compares the transition time of each individual transition relation between adjacent analysis unit periods, and writes the rate of change thus obtained into the activity time change table created within the change information storing section 140a. The above-mentioned process is carried out for every analysis unit period. Thus, an activity time change table for each analysis unit period is created within the change information storing section 140a.

FIG. 27 is a diagram showing examples of the data structure of an activity time change table. Activity time change tables 142a, 142b, 142c, and so on shown in FIG. 27 are stored in the change information storing section 140a. The activity time change table 142a is an activity time change table corresponding to a pair of analysis unit periods whose period IDs are "#01" and "#02". The activity time change table 142b is an activity time change table corresponding to a pair of analysis unit periods whose period IDs are "#02" and "#03". The activity time change table 142c is an activity time change table corresponding to a pair of analysis unit periods whose period IDs are "#03" and "#04".

Table names corresponding to activities as transition sources are listed in the vertical direction of each of the activity transition tables 142a, 142b, 142c, and so on, and table names corresponding to activities as transition targets are listed in the horizontal direction. Values indicating rates of change in transition time are set in the intersecting fields of the activities as transition sources and the activities as transition targets. It should be noted that a field is blank if a transition relation has not occurred in at least one of two analysis unit periods, and if there is no change in transition time. Values are set in the activity transition tables 142a, 142b, 142c, and so on by the time change table generating section 185.

Next, a description will be given of a display screen displayed on the monitor 11 by the analysis result displaying section 190a after completion of a change analysis process.

Figure 28:
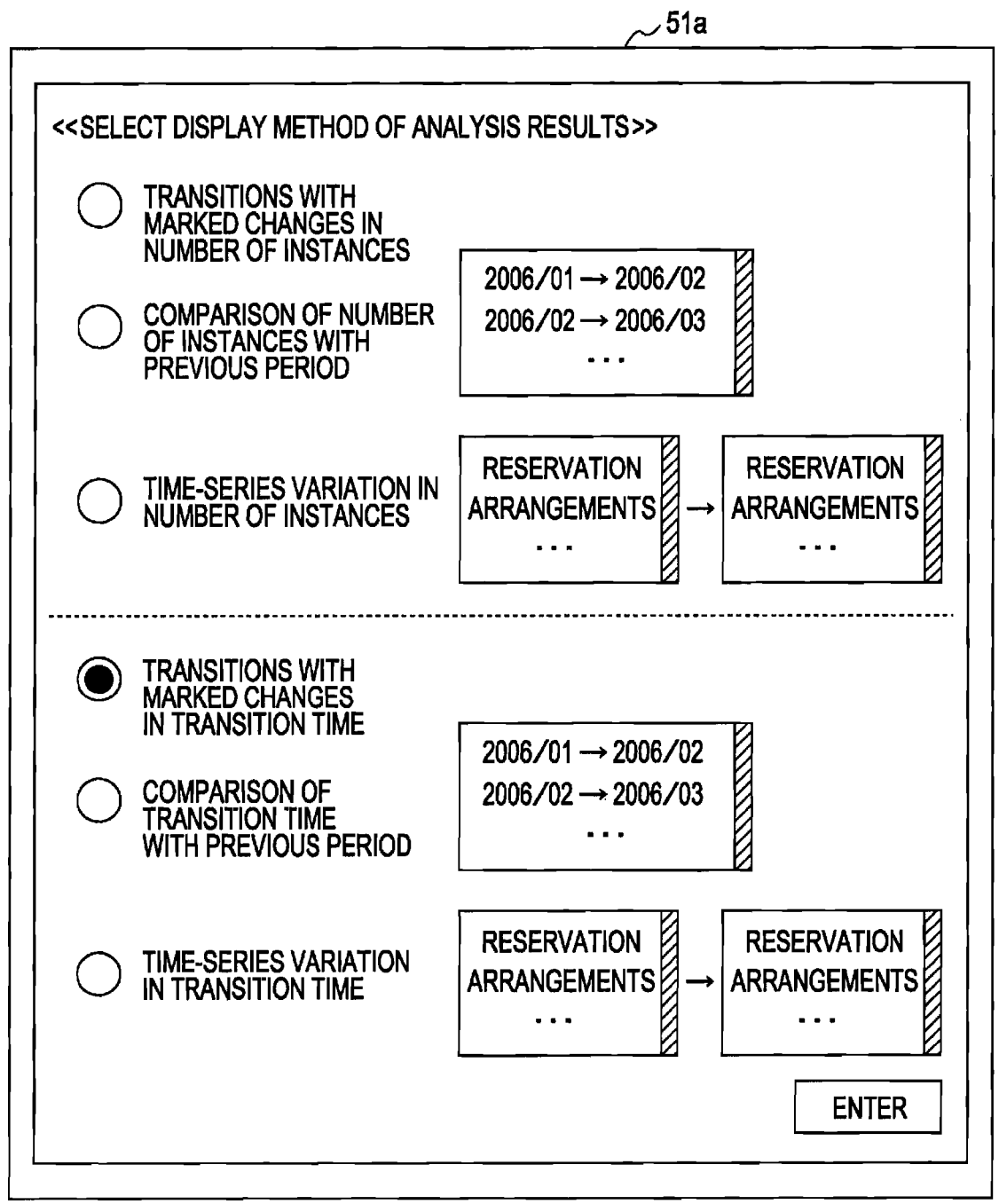
FIG. 28 is a diagram showing an example of a selection screen for selecting a display method according to the second embodiment.

FIG. 28 is a diagram showing an example of the screen for selecting a display method according to the second embodiment. A display screen (user interface) 51a shown in FIG. 28 is displayed on the monitor 11 by the analysis result displaying section 190a immediately after completion of a change analysis process. The display screen 51a includes six selection items for selecting the method of displaying analysis results, and an enter button for confirming the selected display method.

The meanings of a first selection item, second selection item, and third selection item are the same as those of the first embodiment. A fourth selection item indicates a display method of displaying a list of transitions with marked changes in transition time. A fifth selection item indicates a display method of visually displaying changes in transition time between two specified analysis unit periods by using a workflow diagram. A sixth selection item indicates a display method of performing graphic display of time-series variation in the transition time of a specified transition relation.

When one of the six selection items is selected through an operation input by the user and the enter button is pressed, the analysis result displaying section 190a displays analysis results in accordance with the selected display method. Hereinbelow, a description will be given of the fourth display method, the fifth display method, and the sixth display method that represent differences from the first embodiment.

FIG. 29 is a diagram showing an example of the display screen of analysis results according to the fourth display method. A display screen 55 shown in FIG. 29 is displayed on the monitor 11 by the analysis result displaying section 190a when the fourth selection item is selected in the display screen 51a. The display screen 55 includes an item indicating transition relations whose transition times have increased by 30 percent or more, and an item indicating transition relations whose transition times have decreased by 30 percent or more. In each of the items, a list of correspondences between an analysis unit period during which such a change has occurred and a transition relation that has changed is displayed.

For example, information "February 2006: arrangement details→inspection" is displayed in the item indicating transition relations whose transition times have increased. This refers to the mean time required from updating of a table "arrangement details" to updating of a table "inspection" has increased by 30 percent or more between January 2006 (the "previous period" of the pair of analysis unit periods) and February 2006 (the "current period" of the pair of analysis unit periods). The displayed contents of the display screen 55 are generated by extracting transition relations that match the conditions of the individual items, from the activity time change table stored in the change information storing section 140a.

Figure 30:
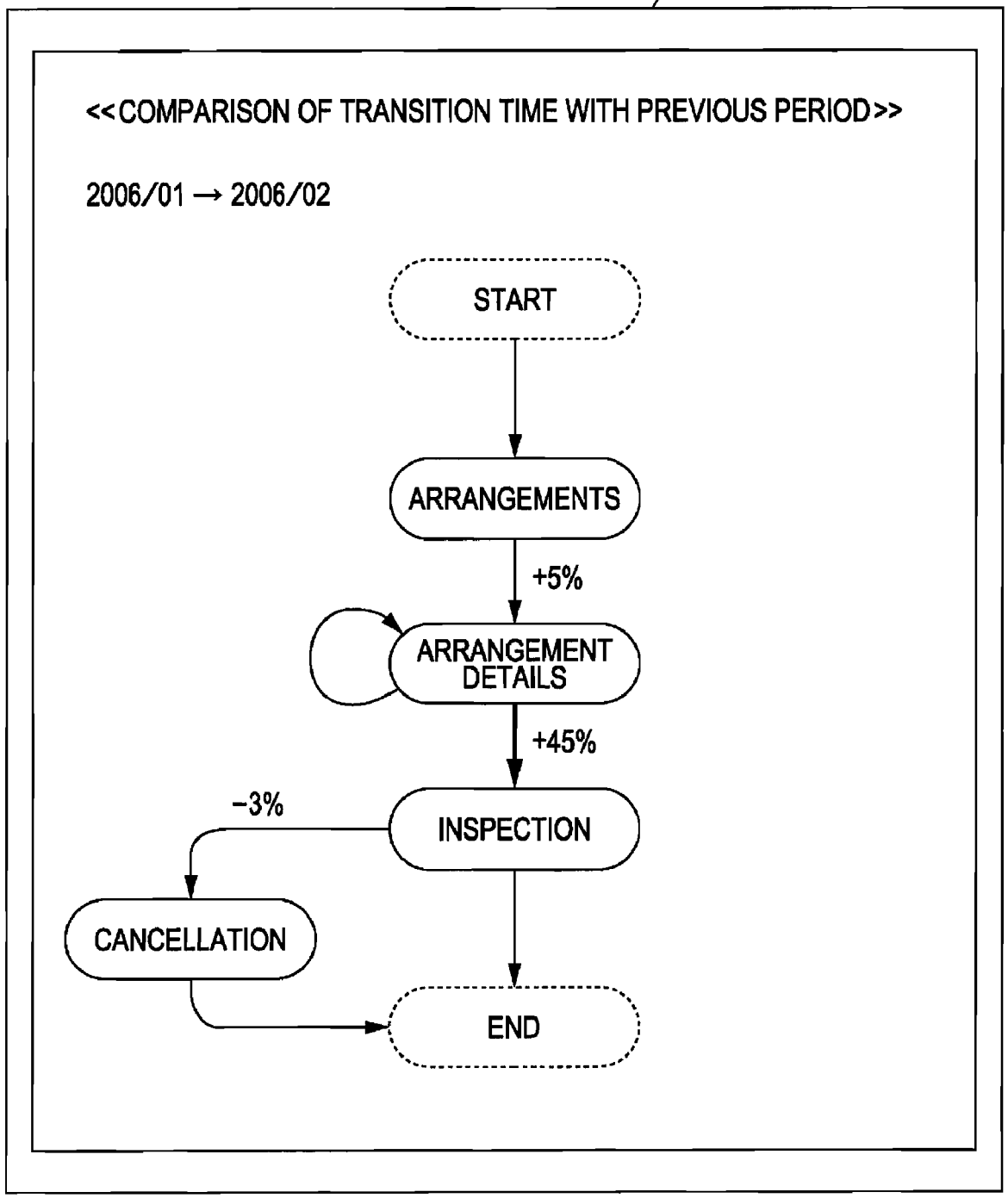
FIG. 30 is a diagram showing an example of a display screen for displaying analysis results according to a fifth display method.

FIG. 30 is a diagram showing an example of the display screen of analysis results according to the fifth display method. A display screen 56 shown in FIG. 30 is displayed on the monitor 11 by the analysis result displaying section 190a when the fifth selection item is selected and a pair of analysis unit periods are specified in the display screen 51a. The display screen 56 displays a workflow diagram with a table name (data activity) as a node and a transition relation as a link.

Here, information indicating a rate of change is added to the link to a transition relation whose transition time has changed. Further, the link to a transition relation whose transition time has increased or decreased by 30 percent or more is highlighted in bold type. For example, the display screen 56 shown in FIG. 30 shows that the transition time of a transition relation with "arrangement details" as the transition source and "inspection" as the transition target has increased by 45 percent in February 2006 relative to January 2006.

The displayed contents of the display screen 56 are generated from the workflow information stored in the work information storing section 130a and the activity time change table stored in the change information storing section 140a. That is, the analysis result displaying section 190a acquires two workflow tables corresponding to a pair of specified analysis unit periods from the work information storing section 130a, and generates a workflow diagram representing all the activity sequences described in the workflow table. Thereafter, the analysis result displaying section 190a acquires an activity change table corresponding to the pair of specified analysis unit periods from the change information storing section 140a, and adds information indicating changes in transition time to the workflow diagram for display.

Figure 31:
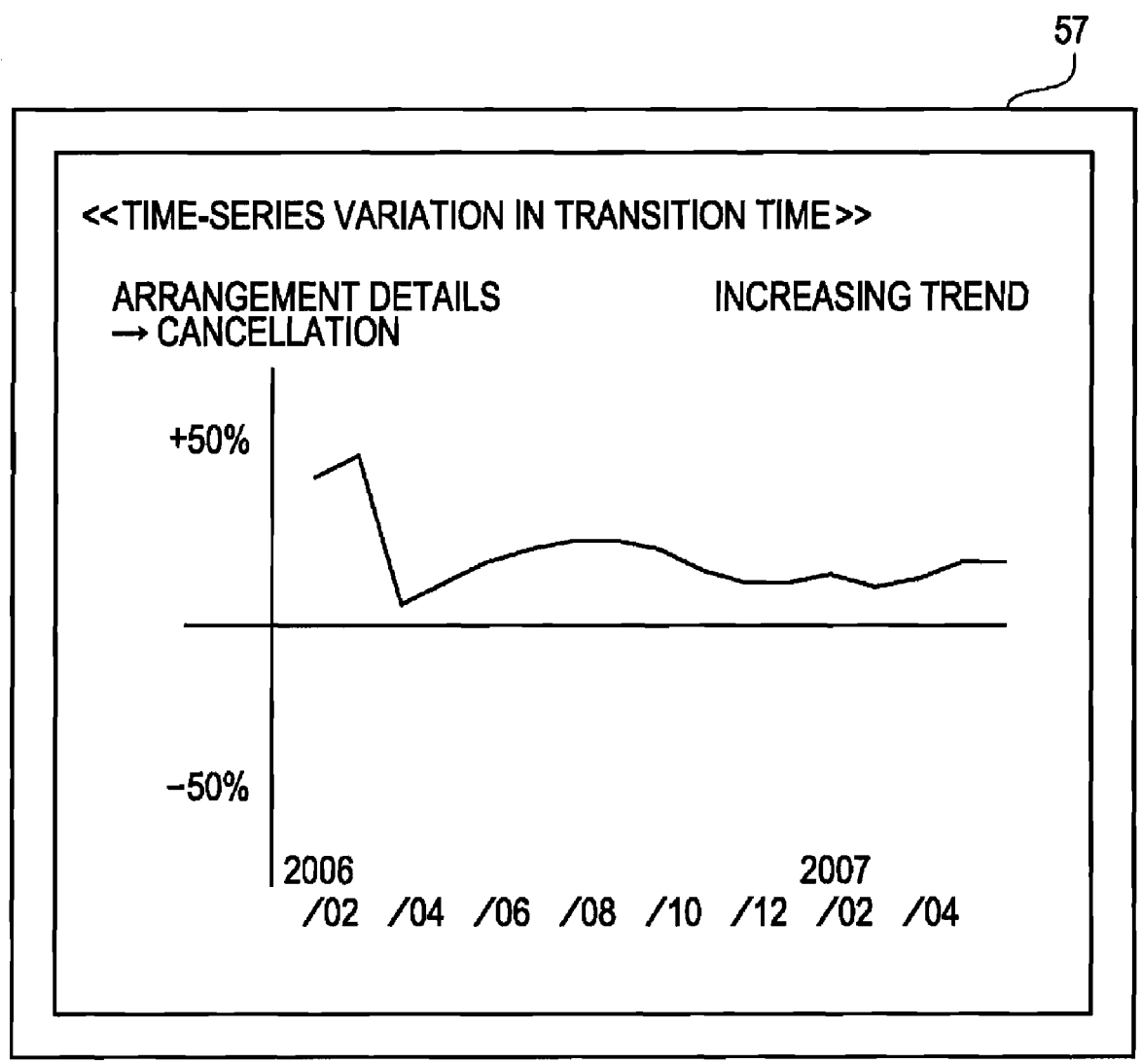
FIG. 31 is a diagram showing an example of a display screen for displaying analysis results according to a sixth display method.

FIG. 31 is an example of the display screen of analysis results according to the sixth display method. A display screen 57 shown in FIG. 31 is displayed on the monitor 11 by the analysis result displaying section 190a when the sixth selection item is selected and a transition relation is specified in the display screen 51a. The display screen 57 displays a line graph with a rate of change taken along the vertical axis and time taken along the horizontal axis. The line graph is generated by extracting values in the field of a specified transition relation from individual activity time change tables stored in the change information storing section 140a, and arranging the values in time series.

The display screen 57 also displays information indicating the general trend in the change of transition time. Specifically, "increasing trend" is displayed as the general trend if a period during which the rate of change in transition time is positive has been continuing. "Decreasing trend" is displayed as the general trend if a period during which the rate of change in transition time is negative has been continuing. Further, if a period during which the rate of change is positive and a period during which the rate of change is negative appear alternately, the cycle is calculated by statistical processing and displayed. FIG. 31 shows an example where the transition time exhibits an increasing trend.

According to the fourth display method and the fifth display method mentioned above, transition relations whose transition times have increased by 30 percent or more and transition relations whose transition times have decreased by 30 percent or more are determined as transition relations with marked changes in transition time. However, it is also possible to change the threshold as appropriate. In this case, the administrator or user of the work analysis device 100a may set a threshold in advance prior to display of analysis results.

By using the work analysis device 100a as described above, the same effect as that of the work analysis device 100 according to the first embodiment can be attained. Further, by using the work analysis device 100a, the user can easily grasp when and what kind of a delay in work occurred during the operating period of the computer system.

In particular, since the work analysis device 100a can display a list of transitions with marked increases/decreases in transition time, the contents of work that require consideration can be easily identified even when the overall workflow is extremely complicated. Further, a rate of change in transition time can be displayed in association with a workflow diagram, thus making it easier to grasp the locations where changes have occurred with respect to the entire work. Further, the time-series variation in transition time can be displayed in the form of a graph, thus making it easier for the user to grasp the trend of change (increasing trend, decreasing trend, cyclic, or the like).

Therefore, the manager or system administrator can appropriately consider a review of work contents, relocation of resources, and the like in accordance with changes in transition time. Specifically, this may involve allocating more throughput of the computer system or more personnel to a work activity corresponding to a transition relation whose transition time has increased. Further, this may also involve predicting the transition time in the future from the trend of change, and increasing the throughput of the computer system or personnel in advance. Further, this may also involve investigating the casual relation between the period in which a change occurred and work performance in order to consider a measure for reducing transition time.

In this embodiment, a change analysis process is executed with respect to all the analysis unit periods at once. However, it is also possible to accumulate analysis results, and execute a change analysis process with respect to a new analysis unit period on the basis of differences from the accumulated results. This enables a reduction in processing time.

In this embodiment, each individual analysis unit period is defined by explicitly designating the start date and the finish date. However, a plurality of analysis unit periods may be defined at once by specifying the length of each analysis unit period such as in one-month or one-week units.

In the second embodiment, the activity transition time table and the activity time change table are generated after the activity transition table and the activity change table are generated. However, the generation order may be reversed. Alternatively, the activity change table and the activity time change table may be generated after the activity transition table and the activity transition time table are generated.

In the second embodiment, changes in transition time are analyzed as well as changes in the number of instances of a transition relation. However, it is also possible to analyze changes of associated information other than transition time. For example, it is also possible to analyze changes in the size of a value (e.g. the number of digits of a numerical value) that has been updated by a table update process.

While the work analysis program and the work analysis device according to the present invention have been described above by way of the embodiments illustrated in the drawings, the present invention is not limited to these embodiments, and the configurations of respective parts can be replaced by arbitrary configurations having the same function. Further, other arbitrary structures or steps may be added to the present invention. Further, the present invention may be constituted by a combination of two or more arbitrary configurations (features) of the above-described embodiments. In other words, according to an aspect of the embodiments, any combinations of the described features, functions and/or operations can be provided.

The above-mentioned processing function can be realized by a computer. In other words, the embodiments can be implemented by computing hardware and/or software. For example, a program describing the processing contents of the function to be included in the work analysis device 100 is provided. The program is executed by the computer, thereby realizing the above-described processing function on the computer. The program describing the processing contents may be recorded on computer-readable media comprising computer- readable recording media and/or communication media. Examples of the computer-readable recording media include a magnetic recording apparatus, an optical disk, a magneto-optical disk, and a semiconductor memory. Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), and a CD-R (Recordable)/RW.

When distributing a program, for example, a portable recording medium such as a DVD or CD-ROM having that program recorded thereon is sold. The program may be stored in a storage device of a server computer, and may be transferred from the server computer to another computer via a network.

A computer that is to execute the above-mentioned program stores in its storage device the program recorded on a portable recording medium or the program transferred from the server computer. The computer reads the program from its storage device, and executes processing according to the program. Alternatively, the computer may read a program directly from the portable recording medium and execute the processing according to the program. Each time a program is transferred from the server computer, the computer may sequentially execute the processing according to the received program.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A non-transitory computer-readable recording medium recording a work analysis program for analyzing a flow of work based upon an operating status of a computer system, said work analysis program causing a computer to execute operations comprising:
    storing a plurality of update information each of which including an identifier individually identifying a work process accompanying updates of a plurality of data sets, an update time at which said data sets were updated, and data set names of said data sets;
    storing period information that defines splitting at least a part of an operating period of said computer system into a plurality of analysis unit periods;
    classifying said plurality of update information into said plurality of analysis unit periods corresponding to each update time;
    generating first workflow information, in which a plurality of data set names are sorted for each of said work processes, based upon a first part of said plurality of update information classified into a first analysis unit period;
    generating second workflow information, in which a plurality of data set names are sorted for each of said work processes, based upon a second part of said plurality of update information classified into a second analysis unit period;
    generating first transition information indicating a transition relation between two of said data sets that have been successively updated, based upon said first workflow information
    generating second transition information indicating another transition relation between two of said data sets that have been successively updated, based upon said second workflow information;
    generating change information including some differences between said first transition information and said second transition information, based upon a comparison of said first transition information and said second transition information; and
    outputting said change information.

2. The non-transitory computer-readable recording medium recording said work analysis program according to claim 1, wherein said change information generating detects through comparison of said first and second transition information a transition relation that has newly occurred and/or a transition relation that has disappeared, and adding information indicating a correspondence between said analysis unit periods and each of said transition relation that has newly occurred and/or said transition relation that has disappeared, to said change information.

3. The non-transitory computer-readable recording medium recording said work analysis program according to claim 1, wherein said change information generating calculates a rate of change in a number of occurrences for each of said transition relations through comparison of said first and second transition information, and adds information indicating time-series variation in said rate of change to said change information.

4. The non-transitory computer-readable recording medium recording said work analysis program according to claim 1, wherein said computer operations further comprise:
    generating, for each workflow information, a workflow diagram with respective said data sets of said workflow information represented as nodes and said transition relations represented as links based upon said workflow information and said change information, and displaying said workflow diagram by highlighting said links corresponding to said transition relations whose number of occurrences have changed equal to or more than a predetermined threshold.

5. The non-transitory computer-readable recording medium recording said work analysis program according to claim 1, wherein said computer operations further comprise:
    for each workflow information calculating transition time, which is a statistical value of a time required from updating of each of said data sets as a transition source to updating of each of said data sets as a transition target, for each of said transition relations based upon said update times indicated by said update information used for generating said workflow information, and generating transition time information indicating said transition time of each of said transition relations, with respect to each of said analysis unit periods; and
    generating time change information indicating a change in said transition time of each of said transition relations by comparing said transition time information for each of said analysis unit periods generated by said transition time information generating between adjacent ones of said analysis unit periods.

6. The non-transitory computer-readable recording medium recording said work analysis program according to claim 5, wherein said generation of time change information generating calculates a rate of change in said transition time for each of said transition relations through comparison of said transition time information, and adds information indicating time-series variation in said rate of change to said time change information.

7. The non-transitory computer-readable recording medium recording said work analysis program according to claim 5, wherein said computer operations further comprise:
    generating, for each workflow information, a workflow diagram with said respective data sets of said workflow information represented as nodes and said transition relations represented as links based upon said workflow information and said time change information, and displaying said workflow diagram by highlighting said links corresponding to said transition relations whose transition times have changed equal to or more than a predetermined threshold.

8. A work analysis device which analyzes a flow of work based upon an operating status of a computer system, comprising:
    a computer processor that executes:
        storing a plurality of update information each of which including an identifier for individually identifying a work process accompanying updates of a plurality of data sets, an update time at which said data sets were updated, and data set names of said data sets;
        storing period information that defines splitting at least a part of an operating period of said computer system into a plurality of analysis unit periods;
        classifying said plurality of update information into said plurality of analysis unit periods corresponding to each update time;

generating first workflow information, in which a plurality of data set names are sorted for each of said work processes, based upon a first part of said plurality of update information classified into a first analysis unit period;

generating second workflow information, in which a plurality of data set names are sorted for each of said work processes, based upon a second part of said plurality of update information classified into a second analysis unit period; generating first transition information indicating a transition relation between two of said data sets that have been successively updated, based upon said first workflow information;

generating second transition information indicating another transition relation between two of said data sets that have been successively updated, based upon said second workflow information;

generating change information including some differences between said first transition information and said second transition information, based upon a comparison of said first transition information and said second transition information; and outputting said change information.

9. The work analysis device according to claim 8, wherein said change information generating detects through comparison of said first and second transition information a transition relation that has newly occurred and/or a transition relation that has disappeared, and adding information indicating a correspondence between said analysis unit periods and each of said transition relation that has newly occurred and/or said transition relation that has disappeared, to said change information.

10. The work analysis device according to claim 8, wherein said change information generating calculates a rate of change in a number of occurrences for each of said transition relations through comparison of said first and second transition information, and adds information indicating time-series variation in said rate of change to said change information.

11. The work analysis device according to claim 8, further comprising generating, for each workflow information, a workflow diagram with respective said data sets for said workflow information represented as nodes and said transition relations represented as links, based upon said workflow information and said change information, and displaying said workflow diagram by highlighting said links corresponding to said transition relations whose number of occurrences have changed equal to or more than a predetermined threshold.

12. The work analysis device according to claim 8, further comprising:

for each workflow information calculating transition time, which is a statistical value of a time required from updating of each of said data sets as a transition source to updating of each of said data sets as a transition target, for each of said transition relations on the basis of said update times indicated by said update information used for generating said workflow information, and generating transition time information indicating said transition time of each of said transition relations, with respect to each of said analysis unit periods; and generating time change information indicating a change in said transition time of each of said transition relations by comparing said transition time information for each of said analysis unit periods generated by said transition time information generating between adjacent ones of said analysis unit period.

13. The work analysis device according to claim 12, wherein said generation of time change information calculates a rate of change in said transition time for each of said transition relations through comparison of said transition time information, and adds information indicating time-series variation in said rate of change to said time change information.

14. The work analysis device according to claim 12, further comprising generating, for each workflow information, a workflow diagram with respective said data sets of said workflow information represented as nodes and said transition relations represented as links, based upon said workflow information and said time change information, and displaying said workflow diagram by highlighting said links corresponding to said transition relations whose transition times have changed equal to or more than a predetermined threshold.

15. A method of analyzing a flow of work based upon an operating status of a computer system, comprising:

storing a plurality of update information each of which including an identifier for individually identifying a work process accompanying updates of a plurality of data sets, an update time at which said data sets were updated, and data set names of said data sets;

classifying said update information into analysis unit periods corresponding to each update time;

generating first workflow information, in which a plurality of data set names are sorted for each of said work processes, based upon a first part of said plurality of update information classified into a first analysis unit period;

generating second workflow information, in which a plurality of data set names are sorted for each of said work processes, based upon a second part of said plurality of update information classified into a second analysis unit period;

generating first transition information indicating a transition relation between two of said data sets that have been successively updated, based upon said first workflow information;

generating second transition information indicating another transition relation between two of said data sets that have been successively updated, based upon said second workflow information;

generating change information including some differences between said first transition information and said second transition information, based upon a comparison of said first transition information and said second transition information; and outputting said change information.

16. An apparatus, comprising:

a computer processor that executes:

storing a plurality of update information each of which includes an identifier to identify a work process accompanying updates of a plurality of data sets and an update time at which said data sets were updated, storing period information that defines a splitting of at least a part of an operating period for a plurality of work processes into a plurality of analysis unit periods;

classifying said plurality of update information into said plurality of analysis unit periods corresponding to each update time, generating first workflow information of updating of data sets for each work process, based upon a first part of said plurality of update information classified into a first analysis unit period, generating second workflow information of updating of data sets for each work process, based upon a second part of said plurality of update information classified into a second analysis unit period, generating first transition information indicating a relation between two of said data sets that have been successively updated, based upon said first workflow information, generating second transition information indicating another relation between two of said data sets that have been successively updated, based upon said second workflow information, and generating change information including some differences between said first and second transition information.

17. The non-transitory computer-readable recording medium according to claim 1, wherein the first and/or second transition information is generated based upon a number of occurrences of each transition relation.

18. The method according to claim 15, wherein the first and/or second transition information is generated based upon a number of occurrences of each transition relation.

* * * * *

UNITED STATES PATENT AND TRADEMARK OFFICE
CERTIFICATE OF CORRECTION

PATENT NO. : 8,335,759 B2
APPLICATION NO. : 12/042056
DATED : December 18, 2012
INVENTOR(S) : Tsuyoshi Kanai It is certified that error appears in the above-identified patent and that said Letters Patent is hereby corrected as shown below:

First Page Col. 2 (Other Publications); Line 6, Delete "Norh-Holland," and insert -- North-Holland, --, therefor.
    Column 29, Line 39, In Claim 1, delete "information" and insert -- information; --, therefor.
    Column 30, Line 36, In Claim 6, before "calculates" delete "generating".

Signed and Sealed this
Twenty-sixth Day of March, 2013

Teresa Stanek Rea
*Acting Director of the United States Patent and Trademark Office*